US009379832B2

(12) United States Patent
Kitazato

(10) Patent No.: US 9,379,832 B2
(45) Date of Patent: Jun. 28, 2016

(54) RECEPTION APPARATUS, RECEPTION METHOD, TRANSMISSION APPARATUS, TRANSMISSION METHOD, PROGRAM, AND BROADCASTING SYSTEM

(76) Inventor: Naohisa Kitazato, Tokyo (JP)

( * ) Notice: Subject to any disclaimer, the term of this patent is extended or adjusted under 35 U.S.C. 154(b) by 349 days.

(21) Appl. No.: 13/206,627

(22) Filed: Aug. 10, 2011

(65) Prior Publication Data

US 2012/0084802 A1 Apr. 5, 2012

(30) Foreign Application Priority Data

Sep. 30, 2010 (JP) ................................ 2010-222299

(51) Int. Cl.

*H04N 21/442* (2011.01)
*H04H 60/13* (2008.01)
*H04H 60/37* (2008.01)
*H04H 20/31* (2008.01)
*H04H 20/91* (2008.01)
*H04H 20/93* (2008.01)
*H04H 60/59* (2008.01)

(52) U.S. Cl.

CPC ............... *H04H 60/13* (2013.01); *H04H 60/37* (2013.01); *H04H 20/31* (2013.01); *H04H 20/91* (2013.01); *H04H 20/93* (2013.01); *H04H 60/59* (2013.01)

(58) Field of Classification Search

CPC .................................................... H04N 21/442
USPC ............................................................ 725/14
See application file for complete search history.

(56) References Cited

U.S. PATENT DOCUMENTS 7,584,491 B2 * 9/2009 Bruckner et al. ............... 725/36
2004/0031058 A1 * 2/2004 Reisman ....................... 725/112
2006/0242692 A1 * 10/2006 Thione et al. ..................... 726/9
2007/0136753 A1 * 6/2007 Bovenschulte et al. ......... 725/46
2008/0022316 A1 1/2008 Kim et al.
2008/0247543 A1 * 10/2008 Mick et al. .................... 380/201
2010/0280641 A1 * 11/2010 Harkness et al. ............... 700/94

FOREIGN PATENT DOCUMENTS

CN 102870429 A 1/2013
JP 2004-513533 4/2004

(Continued)

OTHER PUBLICATIONS

Jan. 8, 2014, Extended European Search Report for related EP application No. 11178964.0.

(Continued)

*Primary Examiner* — Jefferey Harold
*Assistant Examiner* — Justin Sanders
(74) *Attorney, Agent, or Firm* — Paratus Law Group, PLLC

(57) ABSTRACT

A reception apparatus for receiving transmitted AV (Audio/Video) content includes: an extraction section configured to extract trigger information associated with control of an application program transmitted with the AV content to be executed in cooperation with the AV content; and a control section configured to control processing associated with the application program in accordance with a command indicated by the extracted trigger information, wherein the application program in an active status started up in accordance with the command indicated by the extracted trigger information executes at least one of processing of generating view status information indicative of a user view status and processing of uploading the view status information to a predetermined server.

20 Claims, 25 Drawing Sheets

| Syntax | No. Bits | Format |
|---|---|---|
| Trigger_Info_data() { | | |
| trigger_id | 8 | uimsbf |
| protocol_version | 8 | uimsbf |
| command_code | 8 | uimsbf |
| trigger_validity | 8 | uimsbf |
| App_id | 24 | uimsbf |
| App_type | 4 | uimsbf |
| App_url | 32 | |
| if(command_code==1) { | | (pre-cache) |
| broadcast_App_flag | 1 | uimsbf |
| downloaded_App_flag | 1 | uimsbf |
| internet_App_flag | 1 | uimsbf |
| reserved | 1 | "1" |
| } | | |
| if(coomand_code==2) { | | (execute) |
| broadcast_App_flag | 1 | uimsbf |
| downloaded_App_flag | 1 | uimsbf |
| internet_App_flag | 1 | uimsbf |
| App_life_scope | 1 | uimsbf |
| App_expire_date | 32 | bslbf |
| } | | |
| if(command_code==3) { | | (inject event) |
| reserved | 4 | "1111" |
| event_id | 16 | uimsbf |
| event_embedded_data_length | 8 | uimsbf |
| for(i=0;i<N;i++) { | | |
| event_embedded_data_byte | 8×N | bslbsf |
| } | | |
| } | | |
| if(coomand_code==4 \|\| coomand_code==5) { | | (suspend/ |
| reserved | 4 | terminate) |
| } | | "1111" |
| } | | |

(56) References Cited

FOREIGN PATENT DOCUMENTS

| | | |
|---|---|---|
| JP | 2004-274394 | 9/2004 |
| JP | 2005-311810 | 11/2005 |
| JP | 2006-050134 | 2/2006 |
| JP | 2006-352437 | 12/2006 |
| JP | 2007-311917 | 11/2007 |
| JP | 2007-312070 | 11/2007 |
| JP | 2012-248908 | 12/2012 |
| WO | WO2011/074218 | 6/2011 |

OTHER PUBLICATIONS

Apr. 10, 2014, Japanese Office Action for related JP application No. 2010-222299.

Nov. 2, 2015, CN communication issued for related CN application No. 201110291599.5.

* cited by examiner

FIG. 6

Trigger with “Pre-cache” Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates “pre-cache” command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |

FIG. 7

Trigger with "Execute" Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates "execute" command. |
| Trigger_validity | 8 | The reciprocal of this integer value shows probability this trigger shall be treated as valid. |
| App_id | 24 | Application identifier this command target |
| App_type | 4 | Application type (for example HTML5) |
| App_url | 32 | Location of application content if the application content exists on a server |
| Broadcast_App_flag | 1 | Set when Application content exists on broadcast stream |
| Downloaded_App_flag | 1 | Set when Application content can exist on the local storage (NRT service sent it) |
| Internet_App_flag | 1 | Set when Application content exists on a server |
| App_life_scope | 1 | 0: ES bound 1: service bound |
| App_expire_date | 32 | Passing over it, Application shall be terminated if Terminated Command is not issued. |

FIG. 8

Trigger with “Inject_event” command

| Item | No of Bits | explanation |
| --- | --- | --- |
| Trigger_id | 8 | Idntify Trigger with same function. |
| Protocol_verion | 8 | Set to 0 currently |
| Command_code | 8 | In this case, it indicates “inject event” command. |
| Trigger_validity | 8 | The reciprocal of this integer value shows probability this trigger shall be treated as valid. |
| App_id | 24 | Application identifier this command target |
| App_type | 4 | Application type (for example HTML5) |
| Event_id | 8 | The corresponding event which described in script of the targeted Application shall be fired immediately. |
| Event Embedded Data | N | It is free format data injected into Application along with event. |

FIG. 9

Trigger with “Suspend” Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates “Suspend” command. |
| Trigger_validity | 8 | The reciprocal of this integer value shows probability this trigger shall be treated as valid. |
| App_id | 24 | Application identifier this command target |
| App_type | 4 | Application type (for example HTML5) |

FIG.10

Trigger with “Terminate” Command

| Item | No of Bits | explanation |
|---|---|---|
| Trigger_id | 8 | Idntify Trigger with same function. |
| Protocol_verion | 8 | Set to 0 currently |
| Command_code | 8 | In this case, it indicates “Terminate” command. |
| Trigger_validity | 8 | The reciprocal of this integer value shows probability this trigger shall be treated as valid. |
| App_id | 13 | Application identifier this command target |
| App_type | 4 | Application type (for example HTML5) |

FIG.11

| Syntax | No. Bits | Format |
|---|---|---|
| Trigger_Info_data() { | | |
| trigger_id | 8 | uimsbf |
| protocol_version | 8 | uimsbf |
| command_code | 8 | uimsbf |
| trigger_validity | 8 | uimsbf |
| App_id | 24 | uimsbf |
| App_type | 4 | uimsbf |
| App_url | 32 | |
| if(command_code==1){ | | (pre-cache) |
| broadcast_App_flag | 1 | uimsbf |
| downloaded_App_flag | 1 | uimsbf |
| internet_App_flag | 1 | uimsbf |
| reserved | 1 | "1" |
| } | | |
| if(coomand_code==2){ | | (execute) |
| broadcast_App_flag | 1 | uimsbf |
| downloaded_App_flag | 1 | uimsbf |
| internet_App_flag | 1 | uimsbf |
| App_life_scope | 1 | uimsbf |
| App_expire_date | 32 | bslbf |
| } | | |
| if(command_code==3){ | | (inject event) |
| reserved | 4 | "1111" |
| event_id | 16 | uimsbf |
| event_embedded_data_length | 8 | uimsbf |
| for(i=0;i<N;i++){ | | |
| event_embedded_data_byte | 8×N | bslbsf |
| } | | |
| } | | |
| if(coomand_code==4 \|\| coomand_code==5){ | | (suspend/ |
| reserved | 4 | terminate) |
| } | | "1111" |
| } | | |

RECEPTION APPARATUS, RECEPTION METHOD, TRANSMISSION APPARATUS, TRANSMISSION METHOD, PROGRAM, AND BROADCASTING SYSTEM

BACKGROUND

The present disclosure relates to a reception apparatus, a reception method, a transmission apparatus, a transmission method, a program, and a broadcasting system and, more particularly, to a reception apparatus, a reception method, a transmission apparatus, a transmission method, a program, and a broadcasting system that are configured for the suitable use in the program audience rating survey with given timings in digital television broadcasting for example.

For broadcasting stations broadcasting television programs (hereafter also referred simply as programs), it is important to correctly know the audience rating of each program. Especially, because private broadcasting stations providing program broadcasting at free of charge are run on the basis of advertisement fees paid by CM (commercial message) sponsors, the private broadcasting stations are required to produce programs that will have audience ratings as high as possible in order to sign more sponsorship contracts. In order to attain this target, the private broadcasting stations must correctly grasp the audience rating of each broadcast television program, thereby reflecting the results of the survey onto future program production.

With related-art audience rating measurement techniques, audience rating measurement firms install dedicated survey devices on the television receivers of the predetermined number of randomly selected sample families to measure the audience status from time to time, thereby transmitting the measurement results to the firms (refer to Japanese Patent Laid-open No. 2006-50134 for example).

SUMMARY

Related-art audience rating measurement techniques provide only the information indicative of the viewed (or receive) channels for each television receiver.

However, as recent digital television receivers are gaining popularity, sophisticated demands are increasing that, by use of the functions of these digital television receivers, the accuracy of audience rating is raised by measuring the viewing states of more digital television receivers and the trends of viewers are grasped by obtaining viewers' profile information including age, gender, address, and preference for example.

Therefore, the present disclosure addresses the above-identified and other problems associated with related-art methods and apparatuses and solves the addressed problems by providing a reception apparatus, a reception method, a transmission apparatus, a transmission method, a program, and a broadcasting system that are configured to measure television program audience ratings with higher accuracies than before without resorting to devices and apparatuses dedicated to audience rating measurement.

In carrying out the disclosure and according to a first embodiment thereof, there is provided a reception apparatus for receiving transmitted AV (Audio/Video) content. This reception apparatus has: an extraction section configured to extract trigger information associated with control of an application program transmitted with the AV content to be executed in cooperation with the AV content; and a control section configured to control processing associated with the application program in accordance with a command indicated by the extracted trigger information. In this configuration, the application program in an active status started up in accordance with the command indicated by the extracted trigger information executes at least one of processing of generating view status information indicative of a user view status and processing of uploading the view status information to a predetermined server.

In the above-mentioned reception apparatus, the control section controls one of acquisition and startup of the application program, an event firing in the application program in an active status, suspension of the application program in an active status, and termination of the application program in an active status in accordance with a command indicated by the extracted trigger information.

In the above-mentioned reception apparatus, the application program in an active status fires an event in accordance with a command indicated by the extracted trigger information and uploads the view status information to a predetermined server as the event.

In the above-mentioned reception apparatus, the trigger information includes a parameter indicative of a determination probability between executing processing by regarding the trigger information to be valid and discarding processing by regarding the trigger information to be invalid and the application program in an active status fires an event in accordance with a command indicated by the extracted trigger information only if the trigger information is regarded to be valid on the basis of the parameter, thereby executing processing of uploading the view status information to a predetermined server as the event.

The above-mentioned reception apparatus further has a holding section configured to hold profile information of a user.

In the above-mentioned reception apparatus, the application program in an active status uploads the profile information held in the holding section to a predetermined server along with the view status information.

In the above-mentioned reception apparatus, the control section starts up the application program only if the profile information held in the holding section satisfies a specified condition.

In carrying out the disclosure and according to the first embodiment thereof, there is provided a reception method for a reception apparatus for receiving transmitted AV content. This reception method has: extracting trigger information associated with control of an application program transmitted with the AV content to be executed in cooperation with the AV content; and controlling processing associated with the application program in accordance with a command indicated by the extracted trigger information. In this configuration, the application program in an active status started up in accordance with the command indicated by the extracted trigger information executes at least one of processing of generating view status information indicative of a user view status and processing of uploading the view status information to a predetermined server.

In carrying out the disclosure and according to the first embodiment thereof, there is provided a computer program for controlling a reception apparatus for receiving transmitted AV content, the computer program making a computer of the reception apparatus execute processing. This computer program has: extracting trigger information associated with control of an application program transmitted with the AV content to be executed in cooperation with the AV content; and controlling processing associated with the application program in accordance with a command indicated by the extracted trigger information. In this configuration, the application program in an active status started up in accordance with the command indicated by the extracted trigger information executes at least one of processing of generating view status information indicative of a user view status and processing of uploading the view status information to a predetermined server.

In the first embodiment of the disclosure, trigger information associated with the control of an application program for executing AV content in cooperation therewith is extracted, this trigger information being transmitted with the AV content. In accordance with a command indicated by the extracted trigger information, processing associated with the application program is controlled. It should be noted that at least one of processing of generating view status information indicative of user's view status and processing of uploading the view status information to a predetermined server is executed by the application program in an active status started up in accordance with a command indicated by the extracted trigger information.

In carrying out the disclosure and according a second embodiment thereof, there is provided a transmission apparatus for transmitting AV content. This transmission apparatus has a transmission section configured to transmit trigger information associated with control of an application program to be executed on a reception apparatus along with the AV content in cooperation therewith. In this configuration, the application program in an active status started up in accordance with a command indicated by the trigger information on the reception apparatus executes at least one of processing of generating view status information indicative of a view status of a user of the reception apparatus and uploading the view status information to a predetermined server.

In the above-mentioned transmission apparatus, the transmission section transmits the trigger information with a parameter indicative of a determination probability between executing processing by regarding the trigger information to be valid and discarding processing by regarding the trigger information to be invalid.

The above-mentioned transmission apparatus further has a measurement section configured to measure an audience rating of the AV content on the basis of the view status information uploaded by the reception apparatus.

In carrying out the disclosure and according to the second embodiment thereof, there is provided a transmission method for a transmission apparatus for transmitting AV content. This transmission method has: transmitting trigger information associated with control of an application program to be executed on a reception apparatus along with the AV content in cooperation therewith. In this configuration, the application program in an active status started up in accordance with a command indicated by the trigger information on the reception apparatus executes at least one of processing of generating view status information indicative of a view status of a user of the reception apparatus and uploading the view status information to a predetermined server.

In carrying out the disclosure and according to the second embodiment thereof, there is provided a computer program for controlling a transmission apparatus for transmitting AV content, the computer program making a computer of the transmission apparatus execute processing. This processing has: transmitting trigger information associated with control of an application program to be executed on a reception apparatus along with the AV content in cooperation therewith. In this configuration, the application program in an active status started up in accordance with a command indicated by the trigger information on the reception apparatus executes at least one of processing of generating view status information indicative of a view status of a user of the reception apparatus and uploading the view status information to a predetermined server.

In the second embodiment of the disclosure, trigger information associated with the control of an application program to be executed on the reception apparatus is transmitted with the AV content in cooperation therewith. It should be noted that the application program in an active status started up in accordance with a command indicated by the trigger information on the reception apparatus executes at least one of processing of generating view status information indicative of a view status of a user of the reception apparatus and uploading the view status information to a predetermined server.

In carrying out the disclosure and according to a third embodiment thereof, there is provided a broadcasting system. This broadcasting system has a transmission apparatus for transmitting AV content and a reception apparatus for receiving the transmitted AV content. In this configuration, the transmission apparatus has a transmission section configured to transmit trigger information associated with control of an application program to be executed on a reception apparatus along with the AV content in cooperation therewith. In the above-mentioned configuration, the reception apparatus has an extraction section configured to extract trigger information associated with control of an application program transmitted with the AV content to be executed in cooperation with the AV content and a control section configured to control processing associated with the application program in accordance with a command indicated by the extracted trigger information, and the application program in an active status started up in accordance with a command indicated by the trigger information on the reception apparatus executes at least one of processing of generating view status information indicative of a view status of user of the reception apparatus and processing of uploading the view status information to a predetermined server.

In the third aspect of the disclosure, the transmission apparatus transmits trigger information with the AV content in cooperation therewith. This trigger information is associated with the control of an application program to be executed on the reception apparatus. On the other hand, the reception apparatus extracts trigger information associated with the control of the application program to be executed in cooperation with the AV content. In accordance with a command indicated by the extracted trigger information, the processing associated with the application program is controlled. The application program in an active status started up in accordance with the command indicated by the trigger information on the reception apparatus executes at least one of the processing of generating view status information indicative of the view status of the user of the reception apparatus and the processing of uploading the view status information to a predetermined server.

According to the first embodiment of the disclosure, the user's view status can be transmitted to a predetermined server in accordance with trigger information included in a broadcast signal.

According to the second embodiment of the disclosure, the reception apparatus can be controlled such that the view status of the user of the reception apparatus is transmitted to a predetermined server.

According to the third embodiment of the disclosure, the audience ratings of television programs can be accurately measured without using any dedicated devices of audience rating measurement.

BRIEF DESCRIPTION OF THE DRAWINGS

FIG. 6 is a diagram illustrating items of trigger information of a precache command;

FIG. 7 is a diagram illustrating items of trigger information of an execute command;

FIG. 8 is a diagram illustrating items of trigger information of an inject event command;

FIG. 9 is a diagram illustrating items of trigger information of a suspend command;

FIG. 10 is a diagram illustrating items of trigger information of a terminate command;

FIG. 11 is a diagram illustrating an example of a trigger information syntax;

DETAILED DESCRIPTION OF THE PREFERRED EMBODIMENTS

This disclosure will be described in further detail by way of best modes (hereafter referred to as embodiments of the disclosure) thereof with reference to the accompanying drawings.

(1) Embodiments

Exemplary Configuration of a Broadcasting System

Figure 1:
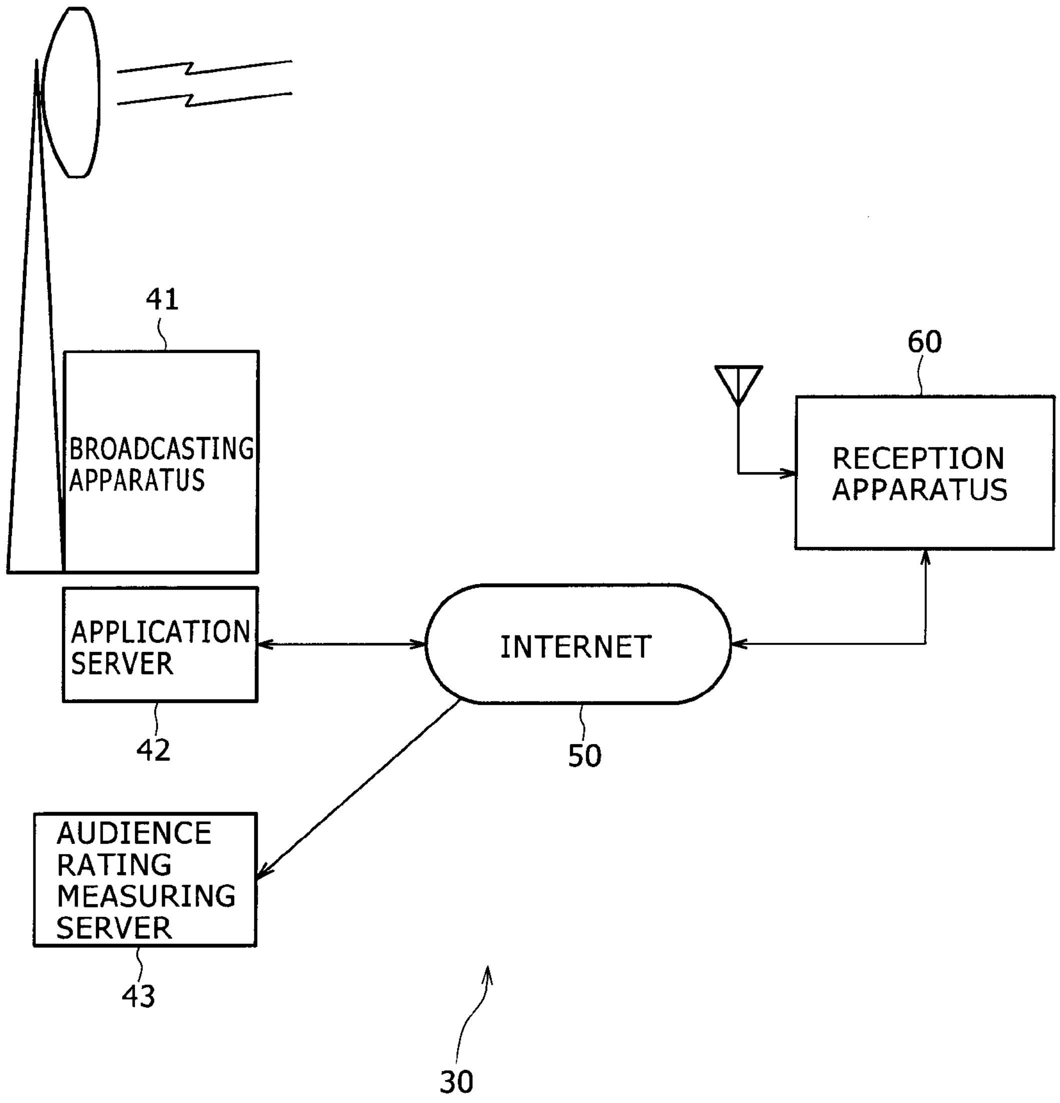
FIG. 1 is a schematic diagram illustrating an exemplary configuration of a broadcasting system practiced as one embodiment of the disclosure.

Now, referring to FIG. 1, there is shown a broadcasting system practiced as one embodiment of the present disclosure. With this broadcasting system 30, a reception apparatus is compliant with trigger information that is transmitted as included in a digital television broadcast signal and information (hereafter referred to as view status information) indicative of the viewing situation of a user is transmitted to the predetermined server. The predetermined server measures with high accuracy of the audience rating of each television program on the basis of the view status information received from each reception apparatus.

It should be noted that the processing of transmitting view status information from the receiving apparatus to a predetermined server is executed by data broadcast content that is executed in cooperation with the AV content of a program and a CM.

The data broadcast content is realized when an application program supplied to the reception apparatus is executed by the computer thereof, so that data broadcast content is hereafter referred to also as a data broadcast application program or a data broadcast appli.

This broadcasting system 30 is made up of a broadcasting apparatus 41 arranged on the broadcasting station side, an application server 42 and an audience rating measuring server 43, and a reception apparatus 60 arranged on the receiver side.

The broadcasting apparatus 41 is configured to transmit digital television broadcast signals. In addition, the broadcasting apparatus 41 transmits trigger information, as included in a digital television broadcast signal, that is commands for specifying the execution of data broadcast content to be executed along with the progression of a program or a CM. To be more specific, trigger information is arranged in a transport stream (TS) of a digital television broadcast signal or embedded in a video signal to be transmitted.

In addition to the information indicative of command type, trigger information includes data broadcast content, namely, information indicative of an acquisition source of an application program. Details of trigger information will be described later.

The application server 42 supplies to the reception apparatus 60 an application program for realizing data broadcast content on demand from the reception apparatus 60 accessing the application server 42 via the Internet 50.

The audience rating measuring server 43 computes the audience rating of each television program on the basis of the view status information uploaded from each reception apparatus 60. It should be noted that the audience rating measuring server 43 may be owned by each broadcasting station. Or, the audience rating measuring server 43 may be shared by a plurality of broadcasting stations. Alternatively, the audience rating measuring server 43 may be arranged by a firm dedicated to audience rating measurement.

The reception apparatus 60 receives a digital broadcast signal from the broadcasting apparatus 41 and outputs a video and an audio of AV content (namely, a television program or a television CM) to a monitor (not shown) at a succeeding stage. In addition, the reception apparatus 60 accesses the application server 42 via the Internet 50 to obtain data broadcast content. Further, the reception apparatus 60 executes the obtained data broadcast content to present various information to the user along the progression of a program, detect the audience status of the user, and notifies the audience rating measuring server 43 of the view status information indicative of results of the detection.

The reception apparatus 60 may exist as a standalone unit or a component in a television receiver or a video recorder for example.

Exemplary Configuration of the Reception Apparatus

Figure 2:
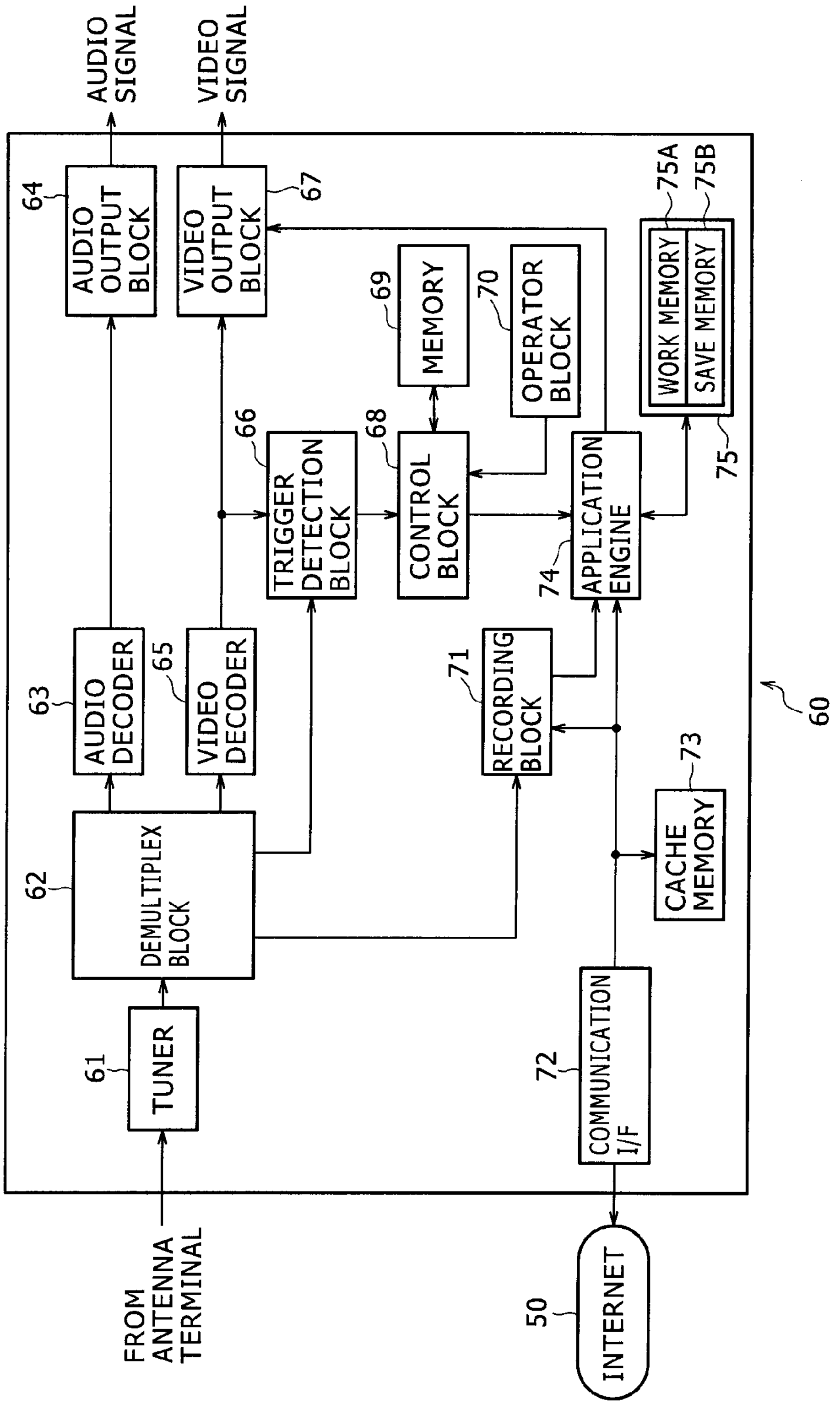
FIG. 2 is a block diagram illustrating an exemplary configuration of a reception apparatus practiced as another embodiment of the disclosure.

Referring to FIG. 2, there is shown an exemplary configuration of the reception apparatus 60. The reception apparatus 60 is made up of a tuner 61, a demultiplex block 62, an audio decoder 63, an audio output block 64, a video decoder 65, a trigger detection block 66, a video output block 67, a control block 68, memory 69, an operator block 70, a recording block 71, a communication I/F (interface) 72, a cache memory 73, an application engine 74, and an application memory 75.

The tuner 61 receives and demodulates a digital television broadcast signal corresponding to a channel selected by the user and outputs a resultant TS (Transport Stream) to the demultiplex block 62. The demultiplex block 62 demultiplexes the TS entered from the tuner 61 into an audio encoded signal, a video encoded signal, and a control signal, outputting these signals to the audio decoder 63, the video decoder 65, and the control block 68, respectively.

Further, the demultiplex block 62 extracts, from the TS, a PCR (Program Clock Reference) in which trigger information is stored and outputs the extracted PCR to the trigger detection block 66.

The audio decoder 63 decodes the entered audio encoded signal and outputs a resultant audio signal to the audio output block 64. The audio output block 64 outputs the entered audio signal to a succeeding stage (a loudspeaker for example).

The video decoder 65 decodes the entered the video encoded signal and outputs a resultant video signal to the trigger detection block 66 and the video output block 67.

The trigger detection block 66 always monitors the entered video signal to detect trigger information embedded in the monitored video signal, outputting the detected trigger information to the control block 68 (if the trigger information is arranged only in a PCR packet of a TS, this operation of the trigger detection block 66 is unnecessary). In addition, the trigger detection block 66 extracts trigger information from a PCR packet entered from the demultiplex block 62 and outputs the extracted trigger information to the control block 68.

The video output block 67 outputs the video signal entered from the video decoder 65 to the succeeding stage. In addition, the video output block 67 synthesizes a video of the data broadcast content entered from the application engine 74 with a video signal entered from the video decoder 65 and outputs a resultant video signal to the succeeding stage.

The control block 68 controls the entire reception apparatus 60 by executing a control program recorded to the memory 69. In addition, on the basis of the trigger information entered from the trigger detection block 66, the control block 68 controls the acquisition and start of a data broadcast application and the firing, suspension, and termination of an event, for example. Further, the control block 68 can also function as a view log manager (to be detailed later with reference to FIG. 21).

The memory 69 stores control programs (including a view log manager program) to be executed by the control block 68. These control programs can be updated based on a digital television broadcast signal or update data obtained through the Internet 50. The operator block 70 detects various operations done by the user and notifies the control block 68 of the corresponding operation signals.

In addition, the memory 69 stores user profile information, such as user age, gender, address and so on entered in advance by the user.

This profile information can be used for the audience rating measurement side to select the reception apparatus 60 as a survey sample, for example. To be more specific, when a data broadcast application program for acquiring and uploading view status information to the reception apparatus 60 is started, the profile information of the user of the reception apparatus 60 that is the survey sample may be specified in items, such as thirties, male, and capital area resident, for example.

It is also practicable to upload this profile information to the audience rating measuring server 43 along with view status information.

The recording block 71 holds in a recording media incorporated therein a downloaded data broadcast application program if the data broadcast application program is distributed by use of a digital television broadcast signal.

The communication I/F 72 connects the reception apparatus 60 to the application server 42 via the Internet 50 under the control of the application engine 74. The application engine 74 obtains a data broadcast application program from the application server 42 via the Internet 50 and the communication I/F 72, thereby storing the obtained data broadcast application program into the cache memory 73 under the control of the control block 68.

The application engine 74 reads the data broadcast application program from the cache memory 73 or the recording block 71 and executes the data broadcast application program under the control of the control block 68.

The application memory 75 is made up of a work memory 75A and a save memory 75B. The application engine 74 stores data associated with the active data broadcast application program (to be more specific, this data includes a display information layer for example) into the work memory 75A. Further, if the active data broadcast application program is suspended, the application engine 74 moves the data from the work memory 75A of the application memory 75 to the save memory 75B. If the suspended data broadcast application program is restarted, the application engine 74 moves the data from the save memory 75B to the work memory 75A to resume a pre-suspended state.

It should be noted that the two areas having the same size in the application memory 75 may be alternated between the work memory 75A and the save memory 75B. This arrangement can eliminate the necessity of moving data between the work memory 75A and the save memory 75B.

A Trigger Information Transmission Method

The following describes a method of transmitting trigger information.

As described above, trigger information may be arranged in a PCR packet of a TS of a digital television broad cast signal, embedded in a video signal, or arranged in a user data area of an MPEG2 video stream multiplexed with a TS.

Figure 3:
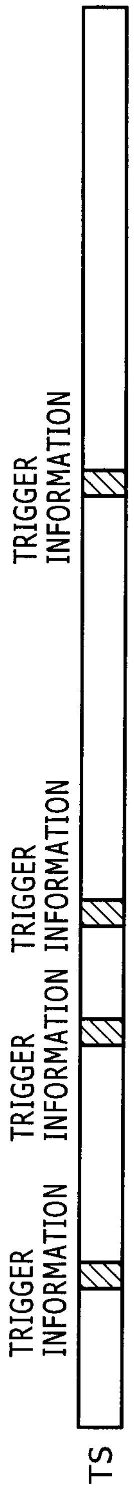
FIG. 3 is a diagram illustrating a concept of transmitting trigger information as included in PCR packets of a TS.

Referring to FIG. 3, there is shown a schematic view in which trigger information is arranged in PCR packets of a TS of a digital television broadcast signal.

As shown in the figure, trigger information is not stored in all PCR packets; trigger information is stored in PCR packets only with proper timings for providing a cooperative operations with a program or a CM.

It should be noted that trigger information is consecutively transmitted two or more times in the same content in consideration of transmission troubles due to electromagnetic wave interference or drops (or reception errors) of the reception apparatus 60.

Figure 4:
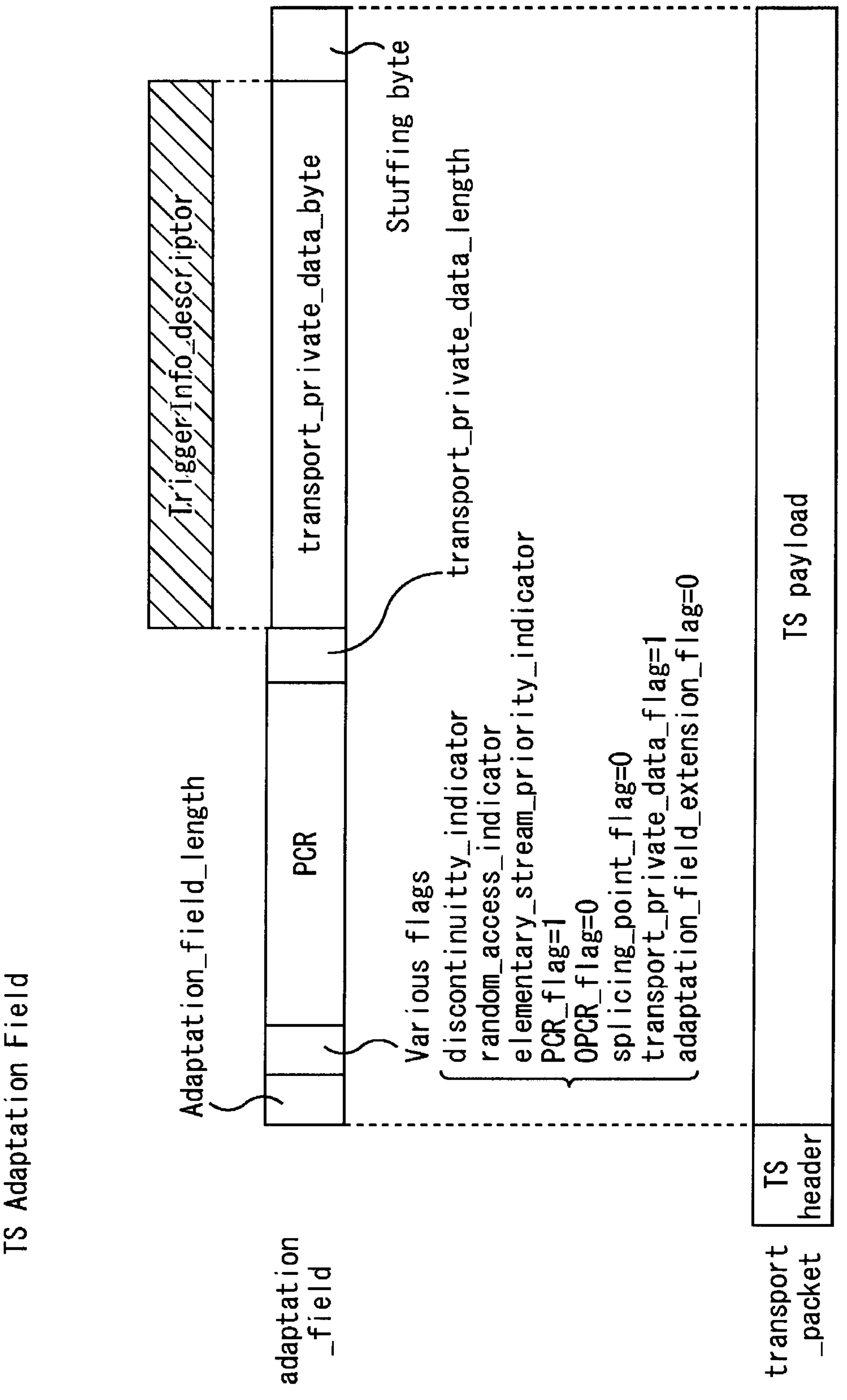
FIG. 4 is a diagram illustrating a specific arrangement of trigger information in a PCR packet.

Referring to FIG. 4, there are shown storage positions of trigger information in a PCR packet. With this PCR packet, a PCR is stored in adaptation field of a TS packet, and trigger information (Trigger Info_descriptor) is stored in transport_private_data_byte following the PCR. It should be noted that, when trigger information is stored, transport_private_data_flag of Various_flags arranged in front of the PCR is set to 1.

Figure 5B:
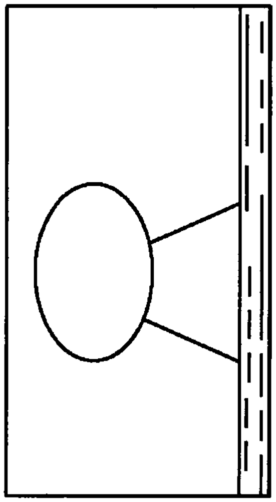
FIGS. 5A and 5B are diagrams illustrating an example of embedding trigger information into a video signal.
Figure 5A:
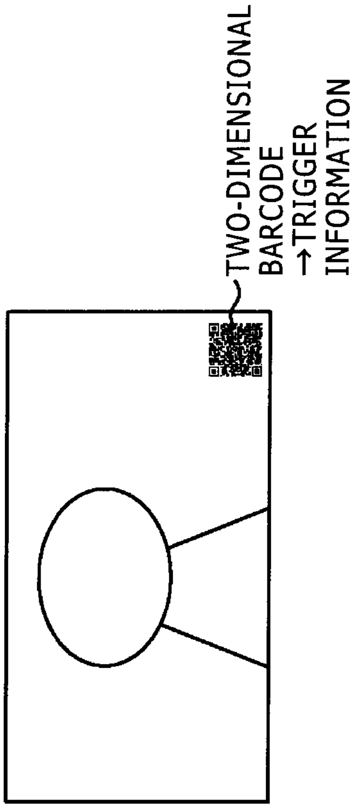

Referring to FIG. 5A and FIG. 5B, there are shown two types of examples in which trigger information is embedded in a video signal.

FIG. 5A shows an example in which trigger information is two-dimensionally barcoded to be superimposingly synthesized with a predetermined position of the image of a video signal (the lower right corner in this example). FIG. 5B shows an example in which trigger information is video-coded to be synchronized with several lines at the bottom of the image of a video signal. The trigger information shown in FIG. 5A and FIG. 5B is detected by the trigger detection block 66 of the reception apparatus 60.

In both examples of FIG. 5A and FIG. 5B, trigger information is arranged on the screen of a television program, so that, if a television program is retransmitted by use of a CATV network, the trigger information is transmitted to the reception apparatus 60 without being deleted.

In both examples of FIG. 5A and FIG. 5B, the trigger information (a two-dimensional barcode or a video code) on the screen can be visually recognized by the user; if this is not desired, the two-dimensional barcode or a video code may be masked with the same pixels as those around the code before being displayed.

The above-mentioned examples show the transmission of trigger information as stored in PCRs; however, the storage position and the transmission method of trigger information are not restricted to these examples.

Details of Trigger Information

The following describes details of trigger information. Trigger information is classified into five types according to commands indicated by the trigger information. These commands are a precache command, an execute command, an inject event command, a suspend command, and a terminate command. It should be noted that other types of commands may be added to these commands.

Referring to FIG. 6, there are shown items included in trigger information that is a precache command. A precache command is used to instruct the reception apparatus 60 to obtain a data broadcast application.

Trigger_id is information for identifying trigger information concerned. If trigger information having the same contents is transmitted two or more times, Trigger_id of each piece of trigger information is the same as that of the other trigger information. Protocol_version is indicative of the version of the protocol of the trigger information concerned. Command_code is indicative of the type of the command of the trigger information concerned. In example shown in FIG. 6, information indicative of a precache command is written.

Trigger_validity is indicative of a value of server access distribution parameter N for specifying probability 1/N for the reception apparatus 60 that has received the trigger information concerned to execute processing in accordance with the trigger information concerned. For example, in order to distribute the accesses to the application server 42 from many possible reception apparatuses 60 into four groups, the same trigger information may be transmitted four times, in which the server access distribution parameter N in the first trigger information is set to 4, the server access distribution parameter N in the second trigger information is set to 3, the server access distribution parameter N in the third trigger information is set to 2, and the server access distribution parameter N in the fourth trigger information is set to 1.

Notifying the reception apparatus 60 of the server access distribution parameter N allows the distribution of trigger information such that the processing of accessing by two or more reception apparatuses 60 to the application server 42 to obtain a data broadcast application is not concentrated in one period of time.

It should be noted that, with the trigger information for controlling the processing in which the application server 42 for example is not accessed, the server access distribution parameter N may always be set to 1.

The access distribution using Trigger_validity will be described later with reference to FIGS. 14A to 15B.

App_id is identification information of a data broadcast application to be obtained in response to the trigger information concerned. App_type is information indicative of a type (HTML5, BML, Java (trademark) or the like) of a data broadcast application corresponding to the trigger information concerned. App_url is the URL of the acquisition source (the application server 42 in this example) of a data broadcast application.

Broadcast_App_flag, Downloaded_App_flag, and Internet_App_flag are indicative of the locations of the program data of a data broadcast application corresponding to the trigger information concerned. Broadcast_App_flag is set to 1 if the data broadcast application corresponding to the trigger information concerned is obtainable from a digital television broadcast signal. Downloaded_App_flag is set to 1 if the data broadcast application corresponding to the trigger information concerned has already been broadcast by a download broadcast service and received by the reception apparatus 60, thereby making this data broadcast application obtainable from a local storage (the recording block 71 for example). Internet_App_flag is set to 1 if the data broadcast application corresponding to the trigger information concerned is obtainable from the application server 42 via the Internet 50.

Referring to FIG. 7, there are shown items included in trigger information that is an execute command. An execute command instructs the reception apparatus 60 to start up a data broadcast application.

Trigger_id, Protocol_version, Command_code, Trigger_validity, App_id, App_type, App_url, Broadcast_App_flag, Downloaded_App_flag, and Internet_App_flag are substantially the same as those of the trigger information that is a precache command shown in FIG. 6. A difference lies in that information indicative of an execute command is written to Command_code.

App_life_scope is indicative of whether or not to terminate a data broadcast application in accordance with view switching for example. App_expire_date is indicative of date and time on which to end an active data broadcast application without receiving a terminate command.

Referring to FIG. 8, there are shown items included in trigger information that is an inject event command. An inject event command instructs the reception apparatus 60 to fire an event in an active data broadcast application.

The event herein denotes a timing for starting up processing of switching information displayed by a data broadcast application or processing of uploading (or notifying) obtained view status information to the audience rating measuring server 43, for example.

Trigger_id, Protocol_version, Command_code, Trigger_validity, App_id, and App_type are substantially the same as those of the trigger information that is a precache command shown in FIG. 6. A difference lies in that information indicative of an inject event command is written to Command_code.

Setting a proper value of N to Trigger_validity allows the distribution of an event occurrence timings in two or more reception apparatuses 60. Consequently, processing of uploading view status information by accessing the audience rating measuring server 43 from two or more reception apparatuses 60 can be distributed, thereby preventing the access concentration at a time. In addition, setting a proper value of N allows the adjustment of the total number of reception apparatuses 60 that upload view status information, namely, the number of samples for use in audience rating measurement.

Event_id is identification information of an event to be fired in a data broadcast application specified by App_id. Event embedded data is indicative of data that is referenced when an event is fired.

Referring to FIG. 9, there are shown items included in trigger information that is a suspend command. A suspend command instructs the reception apparatus 60 to suspend an active data broadcast application.

Trigger_id, Protocol_version, Command_code, Trigger_validity, App_id, and App_type are substantially the same those in the trigger information that is a precache command shown in FIG. 6. A difference lies in that information indicative of a suspend command is written to Command_code.

Referring to FIG. 10, there are shown items included in trigger information that is a terminate command. A terminate command instructs the reception apparatus 60 to terminate an active data broadcast application.

Trigger_id, Protocol_version, Command_code, Trigger_validity, App_id, and App_type are substantially the same those in the trigger information that is a precache command shown in FIG. 6. A difference lies in that information indicative of a terminate command is written to Command_code.

Trigger Information Syntax

Referring to FIG. 11, there is shown an example of a trigger information syntax compatible with the trigger information that is each of the above-mentioned commands. It should be noted that any other trigger information syntaxes are possible than the shown in FIG. 11.

Explanation of Operation

The following describes an outline of an operation of the reception apparatus 60 corresponding to received trigger information, especially, changes of display screens.

Referring to FIG. 12A through FIG. 12G, there are shown transitions in the screen display on the reception apparatus 60 when a corresponding data broadcast application, such as a television program or a television CM, is executed by the reception apparatus 60.

Figures 12A, 12B, 12C, 12D, 12E, 12F, 12G:
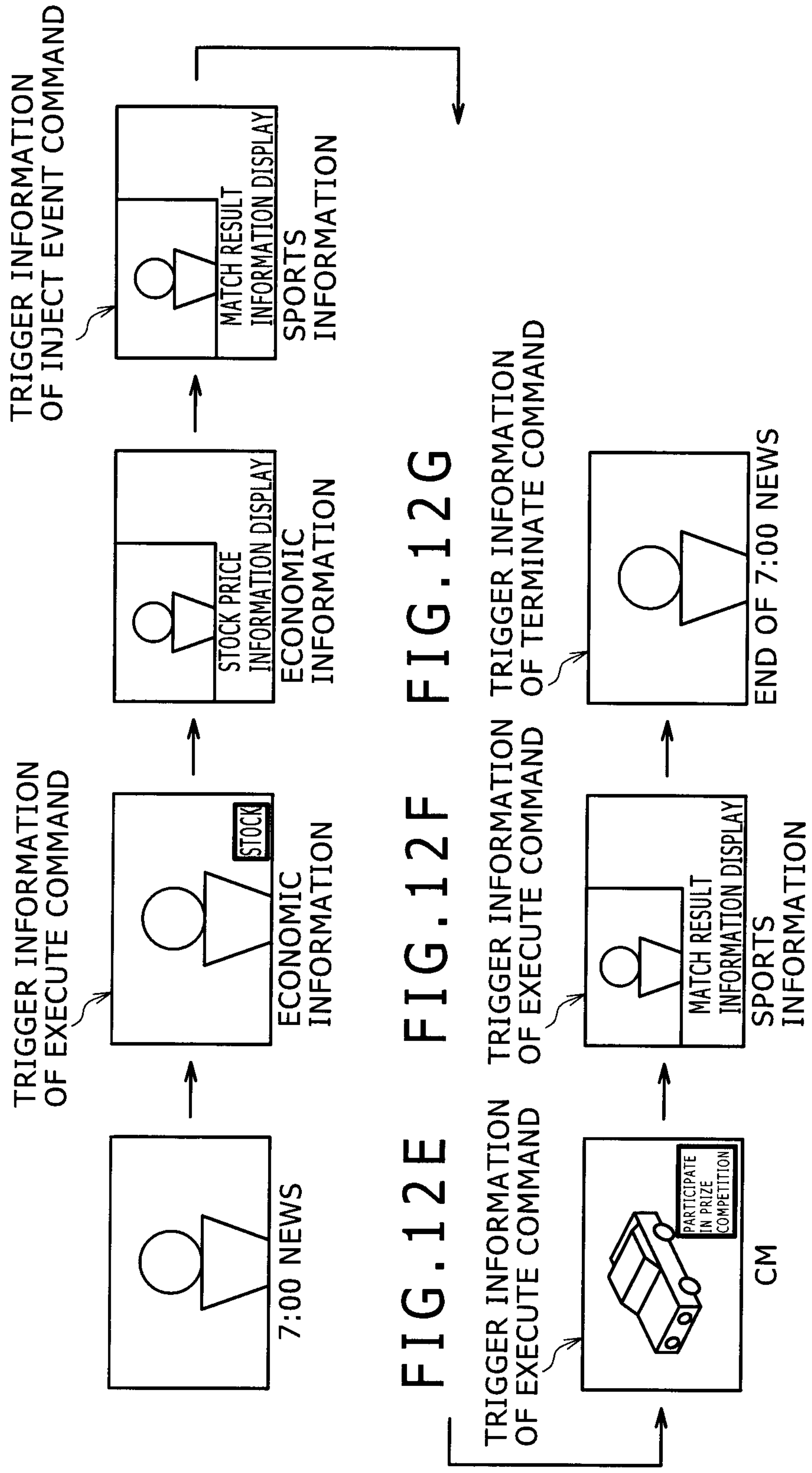
FIGS. 12A through 12G are diagrams illustrating display examples that are presented when an application program is executed along a program or a CM.

For example, as shown in FIG. 12A, when the contents of a television program ("7:00 news" in this example) broadcast so far shift to economic information, trigger information that is an execute command for starting up a data broadcast application corresponding to the program is transmitted. When this trigger information is received by the reception apparatus 60, the data broadcast application is started to display an icon ("Stock" in this example) for prompting the user to display the data broadcast application as shown in FIG. 12B.

When the user clicks this icon, the display (stock price display in this example) is executed on the screen by the data broadcast application as shown in FIG. 12C. Thus, the display by the data broadcast application is executed only when the icon for prompting the user to display the data broadcast application is displayed, thereby preventing a state in which the user not requiring the display by the data broadcast application is bothered from occurring. It should be noted that the above-mentioned icon display is the first display by the data broadcast application.

When the contents of the program are further shifted (to sport information in this example), the trigger information that is an inject event command for firing an event is transmitted. When this trigger information is received by the reception apparatus 60, the event is fired, upon which the display of the data broadcast application on the screen is changed to the display shown in FIG. 12D (to match result information display in this example).

Next, the trigger information that is a suspend command for suspending the active data broadcast application corresponding to the program is transmitted. When this trigger information is received, the active data broadcast application is suspended. After the suspension, trigger information that is an execute command for executing a data broadcast application corresponding to a CM is transmitted. When this trigger information is received, the data broadcast application for the CM is started. Consequently, an icon ("Participate in Prize Competition" in this example) for prompting the user to display the data broadcast application corresponding to the CM is displayed on the screen as shown in FIG. 12E.

When the user clicks this icon, the display ("Participate in Prize Competition" in this example) by the data broadcast application corresponding to the CM is executed on the screen.

After the display of the CM, trigger information that is an execute command for restarting the data broadcast application corresponding to the program is transmitted at the restarting of the program. When this trigger information is received, the data broadcast application corresponding to the CM is ended and the display thereof is deleted as shown in FIG. 12F, thereby resuming the display of the data broadcast application corresponding to the program from the state suspended last.

Next, when the program ends, trigger information that is a terminate command for ending the data broadcast application corresponding to the program is transmitted. When this trigger information is received, the display of the data broadcast application is deleted from the screen as shown in FIG. 12G, thereby displaying only the video of the program.

It should be noted that, as shown in FIG. 12G, the data broadcast application may be displayed by not only a method of providing a area for the display of a data broadcast application by shrinking the display area of a program but a method of superimposing the display of a data broadcast application on the display of a program.

The following describes an operation (hereafter referred to as trigger information handling processing) that is executed when the reception apparatus 60 receives trigger information.

Figure 13:
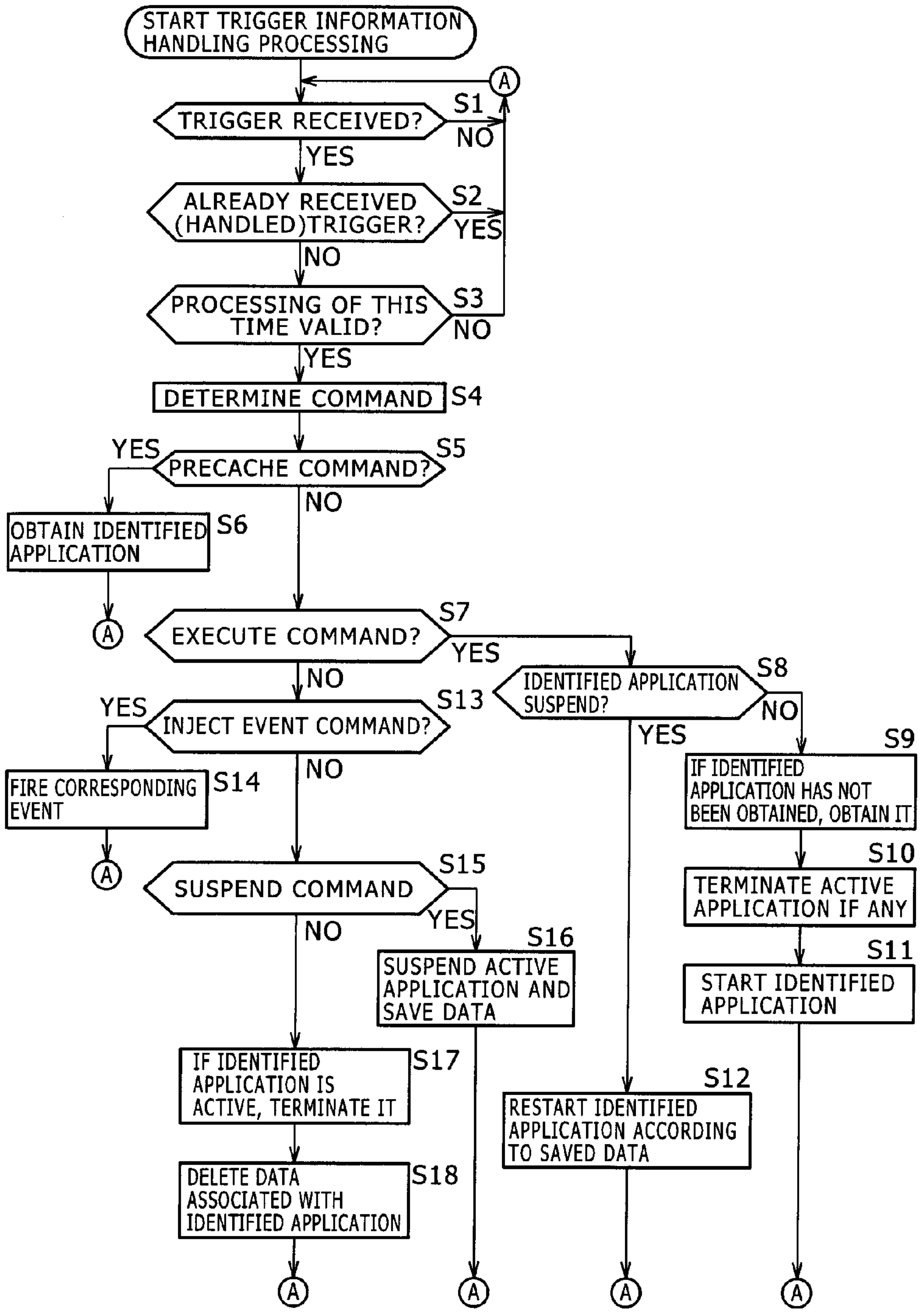
FIG. 13 is a flowchart indicative of trigger information handling processing.

Referring to FIG. 13, there is shown a flowchart indicative of trigger information handling processing. This trigger information handling processing is executed when the user is viewing a television program. To be more specific, this processing is repetitively executed when the reception apparatus 60 is receiving a digital television broadcast signal.

In step S1, the trigger detection block 66 waits until a PCR packet including trigger information is entered from the demultiplex block 62 or trigger information is detected from a video signal outputted from the video decoder 65. When a PCR packet including trigger information is entered or trigger information is detected from a video signal, procedure goes to step S2.

In step S2, the trigger detection block 66 outputs the trigger information to the control block 68. The control block 68 reads Trigger_id from the trigger information to determine whether the processing of steps S4 and on has already been executed on this trigger information. If the processing of steps S4 and on is found already executed, then the procedure is returned to step S1 to repeat the above-mentioned processing therefrom. On the other hand, if the processing of steps S4 and on is found not yet executed, then the procedure goes to step S3.

In step S3, on the basis of the server access distribution parameter N written to Trigger_validity in the trigger information, the control block 68 determines whether the processing of this time is valid (to move the procedure to steps S4 and on for executing server access or return the procedure to step S1). If should be noted that if Trigger_validity is not arranged in the trigger information, the procedure goes to step S4.

The following describes the determination whether the processing of this time is valid or not in step S3.

Figure 14A:
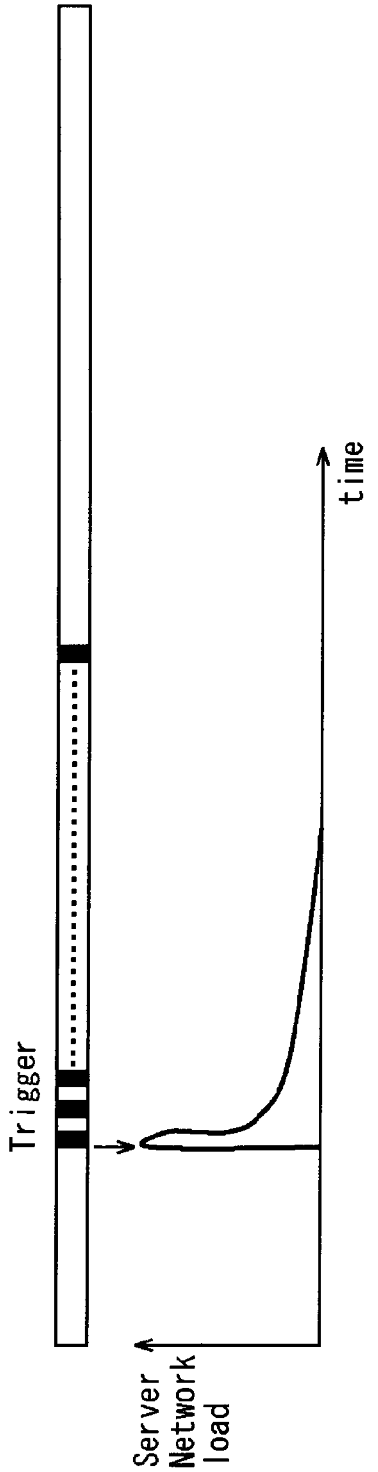
FIGS. 14A and 14B are diagrams illustrating effects of trigger validity.
Figure 14B:
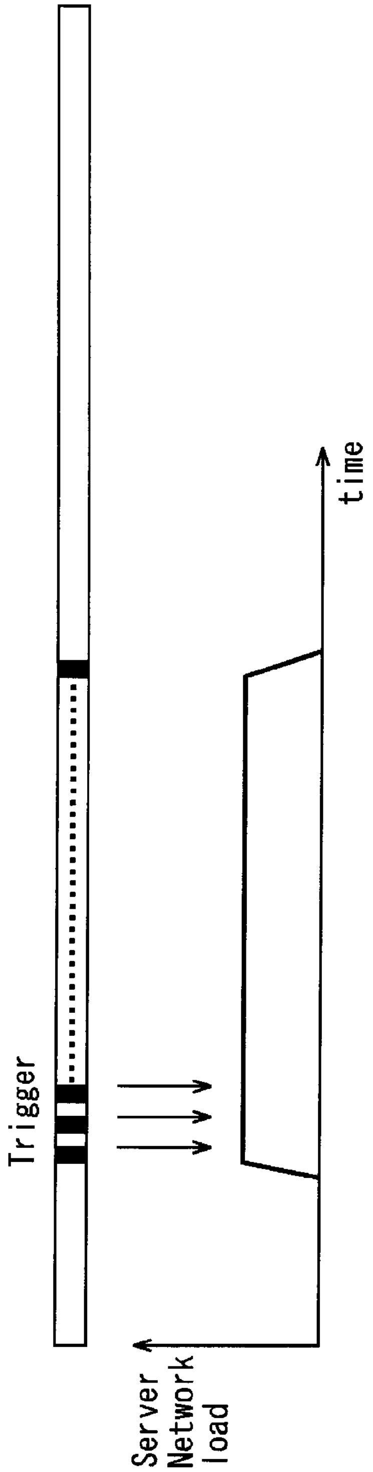

Referring to FIGS. 14A and 14B, there is shown a comparison between the case in which Trigger_validity is not arranged (including the case in which the server access distribution parameter N=1) and the case in which Trigger_validity is arranged. If Trigger_validity is not arranged, the same trigger information is transmitted two or more times but most reception apparatuses 60 respond to the first trigger information, thereby causing the concentration of accesses to the application server 42 for example as shown in FIG. 14A. On the other hand, if Trigger_validlity is arranged and the server access distribution parameter N is set to a proper value, the active reception apparatuses 60 can be distributed to the pieces of the same trigger information transmitted two or more times as shown in FIG. 14B, so that the concentration of accesses to the application server 42 for example can be prevented.

Figure 15A:
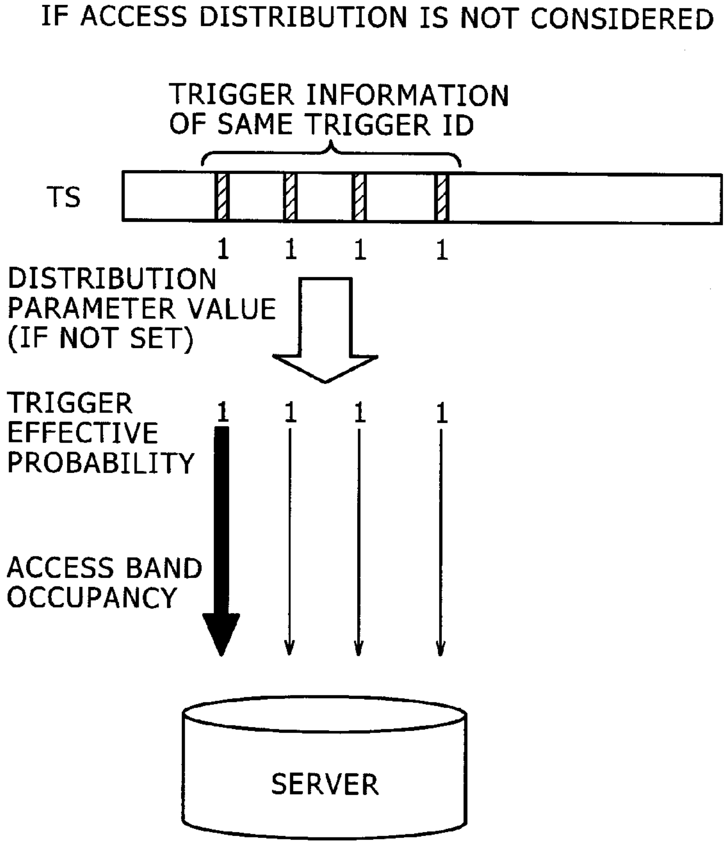
FIGS. 15A and 15B are diagrams illustrating effects of trigger validity.
Figure 15B:
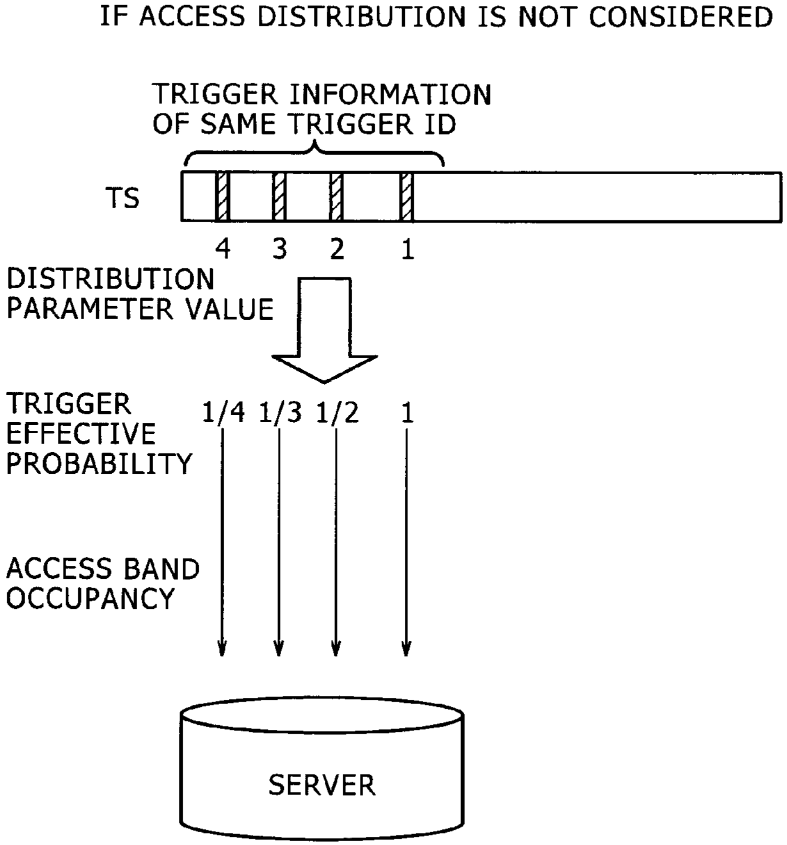

For example, as shown in FIG. 15B, if the broadcasting station side intends to distribute the accesses to the application server 42 for example from many active reception apparatuses 60 into four groups, the broadcasting apparatus 41 transmits the same trigger information four times; the server access distribution parameter N in Trigger_validity of the first trigger information is set to 4, the server access distribution parameter N in Trigger_validity of the second trigger information is set to 3, the server access distribution parameter N in Trigger_validity of the third trigger information is set to 2, and the server access distribution parameter N in Trigger_validity of the fourth trigger information is set to 1.

On the other hand, the control block 68 of the reception apparatus 60 determines validity or invalidity by random numbers under the condition that validity is determined by probability 1/N.

Consequently, if it is assumed that the 100000 units of reception apparatuses 60 be simultaneously executing trigger information handling processing, for example, validity is determined on about 25000 (=100000/4) units of reception apparatuses 60 by the first trigger information (server access distribution parameter N=4), validity is determined on about 25000 (=75000/3) units of reception apparatuses 60 by the second trigger information (server access distribution parameter N=3), validity is determined on about 25000 (=50000/2) units of reception apparatuses 60 by the third trigger information (server access distribution parameter N=2), and validity is determined on all the remaining (=25000/1) units of reception apparatuses 60 by the fourth trigger information (server access distribution parameter N=1).

Returning to FIG. 13, in step S4, the control block 68 reads Command_code of the trigger information to determine whether the command indicated by this trigger information is any one of a precache command, execute command, an inject event command, a suspend command, and a terminate command.

In step S5, the control block 68 determines whether a determination result in step S4 is a precache command or not; if the determination result is found to be a precache command, then the procedure goes to step S6.

In step S6, the program data of a data broadcast application identified by App_id of this trigger information is obtained.

To be more specific, if Broadcast_App_flag of this trigger information is 1, then the program data of a data broadcast application identified by App_id is obtained from the television broadcast signal to be recorded to the recording block 71. If Downloaded_App_flag of this trigger information is 1, then the program data of the data broadcast application identified by App_id is obtained from the recording block 71 that is a local storage. If Internet_App_flag of this trigger information is 1, then the program data of the data broadcast application identified by App_id is obtained from the application server 42 via the Internet 50 to be recorded to the cache memory 73.

It should be noted that, if two or more flags Broadcast_App_flag, Downloaded_App_flag, and Internet_App_flag are 1, then, in accordance of the convenience of the reception apparatus 60, the program data of the data broadcast application identified by App_id of this trigger information can be obtained. Subsequently, the procedure returns to step S1 to repeat the above-mentioned processing therefrom.

In step S5, if the determination result of step S4 is found not to be a precache command, then the procedure goes to step S7. In step S7, the control block 68 determines whether the determination result of step S4 is an execute command or not. If the decision result is found to be an execute command, then the procedure goes to step S8.

In step S8, under the control of the control block 68, the application engine 74 determines whether the data broadcast application identified by App_id of this trigger information is suspended or not. To be more specific, if the data indicative of a suspended state is saved to the data broadcast application identified by App_id, then a suspended state is determined.

In step S8, if the data broadcast application identified by App_id is found not in a suspended state, then the procedure goes to step S9. In step S9, under the control of the control block 68, the application engine 74 obtains the program data of the data broadcast application identified by App_id if the program data has not yet been obtained (namely, this program data is not found in the recording block 71 or the cache memory 73).

In step S10, under the control of the control block 68, the application engine 74 terminates the active data broadcast application if any.

In step S11, under the control of the control block 68, the application engine 74 starts up the data broadcast application identified by App_id. Subsequently, the procedure returns to step S1 to repeat the above-mentioned processing therefrom.

It should be noted that, if the data broadcast application identified by App_id is found to be in a suspended state in step S8, then the procedure goes to step S12. In step S12, under the control of the control block 68, the application engine 74 moves the data of the save memory 75B to the work memory 75A to start up the data broadcast application identified by App_id. Consequently, the suspended data broadcast application identified by App_id is restarted from the suspended state. Subsequently, the procedure returns to step S1 to repeat the above-mentioned processing therefrom.

If the determination result of step S4 is found not to be an execute command in step S7, then the procedure goes to step S13. In step S13, the control block 68 determines whether the determination result of step S4 is to be an inject event command or not. If the determination result is found to be an inject event command, then the procedure goes to step S14.

In step S14, the control block 68 controls the application engine 74 only when there is a match between App_id of this trigger information and App_id of the active data broadcast application to fire (or execute) an event corresponding to Event_id of the trigger information in the active application.

Subsequently, the procedure returns to step S1 to repeat the above-mentioned processing therefrom.

If the determination result of step S4 is found not to be an inject event command in step S13, then the procedure goes to step S15. In step S15, the control block 68 determines whether the determination result of step S4 is a suspend command or not. If the determination result is found to be a suspend command, then the procedure goes to step S16.

In step S16, under the control of the control block 68, the application engine 74 saves the data (namely, the data currently written to the work memory 75A; if the information to be displayed has a layer structure, this data includes information indicative of the layer of the information to be displayed) indicative of a state of the active data broadcast application to the save memory 75A. Subsequently, the procedure returns to step S1 to repeat the above-mentioned processing therefrom.

If the determination result of step S4 is found not to be a suspend command in step S15, then the determination result of step S4 should be a terminate command, so that the procedure goes to step S17. In step S17, under the control of the control block 68, the application engine 74 terminates the data broadcast application identified by App_id if this application is active. In step S18, under the control of the control block 68, the application engine 74 deletes the data associated with the data broadcast application identified by App_id from the work memory 75A and the same memory 75B and, at the same time, deletes the program data of the data broadcast application from the recording block 71 or the cache memory 73. Subsequently, the procedure returns to step S1 to repeat the above-mentioned processing therefrom.

Here, the description of the trigger information handling processing has come to an end. As described above, the above-mentioned trigger information handling processing allows the starting a data broadcast application, the firing of an event, and the termination of the active data broadcast application in association with a television program or a television CM. Further, the above-mentioned trigger information handling processing allows the suspension of a data broadcast application in an active state and the restarting of the data broadcast application from the suspended state.

In addition, the above-mentioned trigger information handling processing allows the operation of data broadcast applications shown below by way of example.

Figure 16:
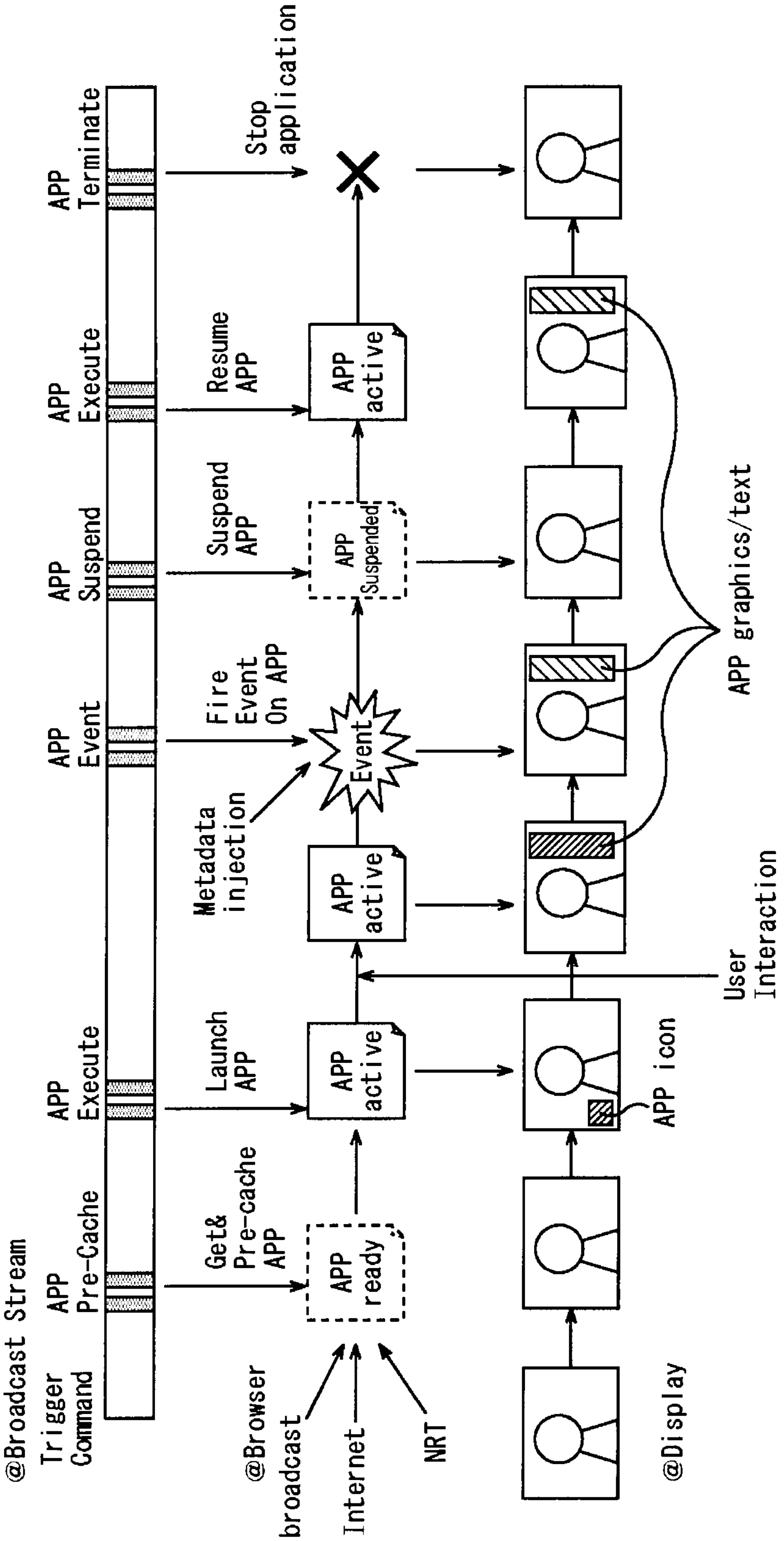
FIG. 16 is a schematic diagram illustrating an example of an operation scenario of an application program.

Referring to FIG. 16, there is shown an example of an operation scenario of a data broadcast application.

When the broadcasting apparatus 41 transmits trigger information that is a precache command for specifying the acquisition of program data of a data broadcast application corresponding to a television program in match with the progression of thereof, the reception apparatus 60 that receives this trigger information obtains the program data of the data broadcast application.

Next, when the broadcasting apparatus 41 transmits the trigger information of the execute command of the data broadcast application corresponding to a television program in match with the progression thereof, the reception apparatus 60 that receives this trigger information starts up the data broadcast application. This startup operation displays an icon for prompting the user to display the data broadcast application in superimposition on the video of the program.

When the user clicks this icon, the display by the data broadcast application is superimposed on the video of the program on the screen.

When the broadcasting apparatus 41 transmits the trigger information that is an inject event command in match with the progression thereof, the reception apparatus 60 that receives this trigger information fires an event in the active data broadcast application (a display change takes place for example).

Next, when the broadcasting apparatus 41 transmits trigger information that is a suspend command for suspending a data broadcast application at a predetermined time, the reception apparatus 60 that receives this trigger information suspends the active data broadcast application (namely, the data associated with the active data broadcast application is held in the save memory 75B). Then, when the broadcasting apparatus 41 transmits trigger information that is an execute command for executing the data broadcast application, the reception apparatus 60 that receives this trigger information restarts the suspended data broadcast application.

Further, when the broadcasting apparatus 41 transmits trigger information that is a terminate command for terminating the television program, the reception apparatus 60 that receives this trigger information terminates the active data broadcast application.

Status Transitions of Data Broadcast Application

Figure 17:
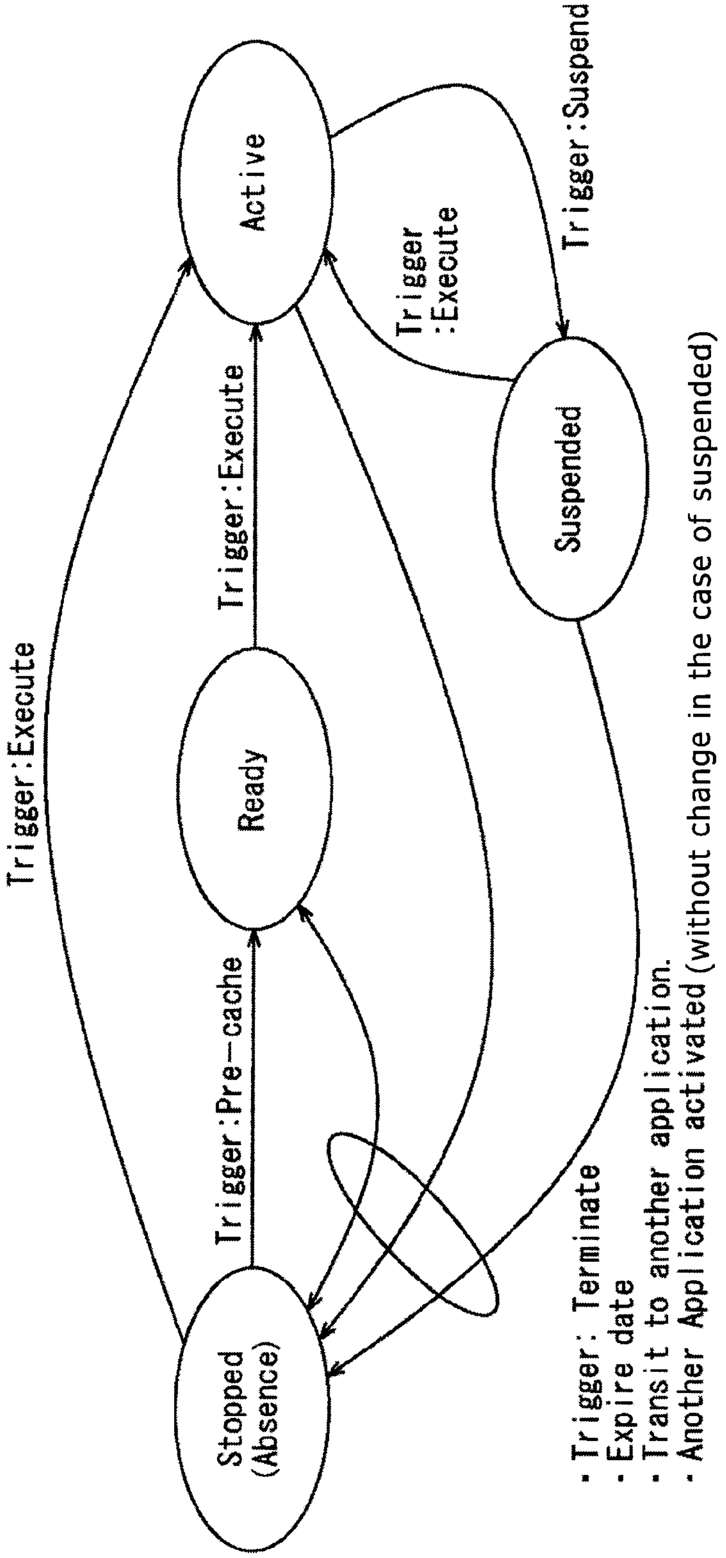
FIG. 17 is a status transition diagram illustrating an application program in the reception apparatus.

Referring to FIG. 17, there are shown status transitions of a data broadcast application operating in the reception apparatus 60.

As shown in FIG. 17, the data broadcast application transitions to any one of four types of statuses; a stopped state, a ready state, an active state, and a suspended state.

In the stopped status, the data broadcast application is not executed and the program data of this data broadcast application has not been obtained. In the ready status, the program data of the data broadcast application has been obtained but the data broadcast application is not executed. In the active status, the data broadcast application has been started up and is being executed. In the suspended status, the execution of the data broadcast application is suspended and the information indicative of the state of suspension is held in the save memory 75B.

If the trigger information that is a precache command is received and the program data of a data broadcast application is obtained with this data broadcast application transitioned to a stopped status, the data broadcast application transitions to a ready status.

If the trigger information that is an execute command is received and a data broadcast application is started with this data broadcast application transitioned to a stopped status or a ready status, the data broadcast application transitions to an active status.

If the trigger information that is a suspend command is received and a data broadcast application is suspended with this data broadcast application transitioned to an active status, the data broadcast application transitions to a suspended status.

If the trigger information that is an execute command is received and a suspended data broadcast application is restarted with this data broadcast application transitioned to a suspended status, the data broadcast application transitions to an active status.

If the trigger information that is a terminate command is received with a data broadcast application transitioned to a ready status, an active status, or a suspended status, the data broadcast application in a ready status, an active status, or a suspended status transitions to a stopped status. It should be noted that the transition to a stopped status occurs also when App_expire_date in the trigger information has passed, another data broadcast application is executed, or a reception channel change has been executed, in addition to the reception of the trigger information that is a terminate command.

Audience Rating Measurement by Use of Audience Rating Measurement Application

The following describes methods of uploading view status information from the reception apparatus 60 to the audience rating measuring server 43 by an audience rating measurement application capable of executing control operations (acquisition, startup, event firing, suspension, and termination) as a data broadcast application having a particular purpose. It should be noted that some of these methods realize audience rating measurement functions by the cooperative operation between a data broadcast application and a program preinstalled in the reception apparatus 60 that is executed by the control block.

Figure 18:
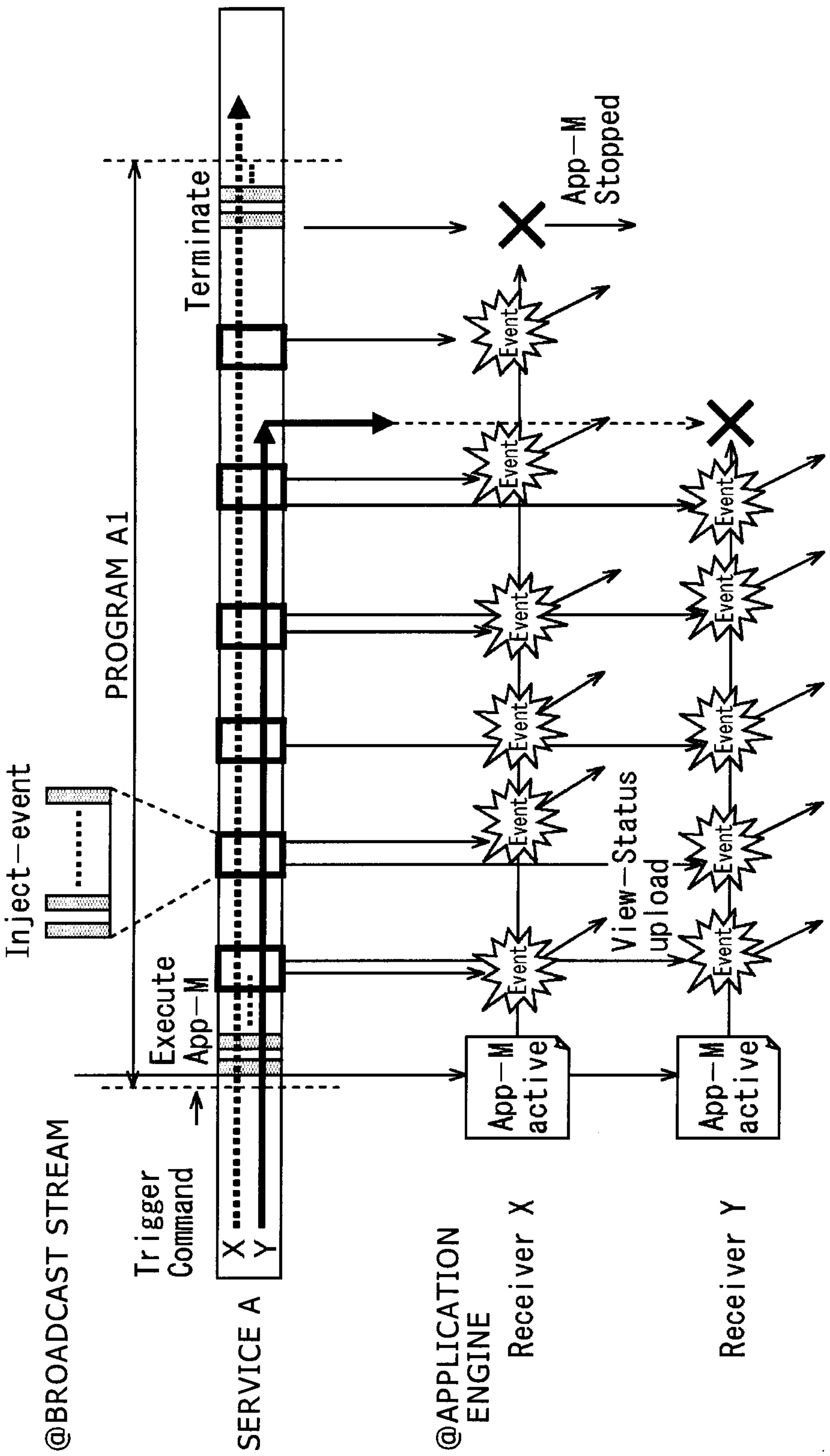
FIG. 18 is a first method of uploading viewing status information.

Referring to FIG. 18, there is shown a first method (a sampling scheme) of uploading view status information to the audience rating measuring server 43.

In the sampling scheme, in response to the trigger information that is an inject event command transmitted during a program, the reception apparatus 60 viewing (or receiving) this program notifies the audience rating measuring server 43 of the information indicative of the viewing of a channel concerned, as the view status information.

The audience rating measuring server 43 in the sampling scheme can be arranged on a program basis, on a service basis, or on a common to all services basis.

As shown in FIG. 18, if program A1 is broadcast in service (channel) A, trigger information that is an execute command for starting up an audience rating measurement application App-M is transmitted upon the starting of program A1. Here, the audience rating measurement application App-M is used to upload the information (view status) indicative that program A1 is being viewed to the audience rating measuring server 43.

During the broadcasting of program A1, the trigger information that is an inject event command is transmitted two or more times at a predetermined sampling period (at an interval of one minute for example). Then, upon the termination of program A1, trigger information that is a terminate command for terminating the audience rating measurement application App-M is transmitted.

For the trigger information that is an inject event command to be transmitted during the program, the trigger information that is an inject event command having the same Trigger_id is consecutively transmitted K times every sampling period.

At this moment, if the server access distribution parameter N of Trigger_validity of the trigger information to be transmitted consecutively K times is set to N=K for the first time, N=K−1 for the second time, N=K−2 for the third time, and N=1 for the Kth time, then the view status can be uploaded to all reception apparatuses 60 receiving program A1.

If the server access distribution parameter N of Trigger_validity of the trigger information to be transmitted consecutively K times is set to N=2K for the first time, N=2K−1 for the second time, N=2K−2 for the third time, and N=K for the Kth time, then the view status can be uploaded to a half of the reception apparatuses 60 receiving program A1.

As shown in FIG. 18, the reception apparatus 60 (receiver X) that have received program A1 from start to end uploads the view status in response to the trigger information that is an inject event command received every sampling period. Next, the audience rating measurement application App-M is terminated in response to the trigger information that is a terminate command.

On the other hand, the reception apparatus 60 (receiver Y) that received program A1 from the start and has not received program A1 up to the end because of the switching to another service (or channel) halfway also uploads the view status in response to the trigger information that is an inject event command received every sampling period. Next, the audience rating measurement application App-M is terminated in response to the switching to another service.

Figure 19:
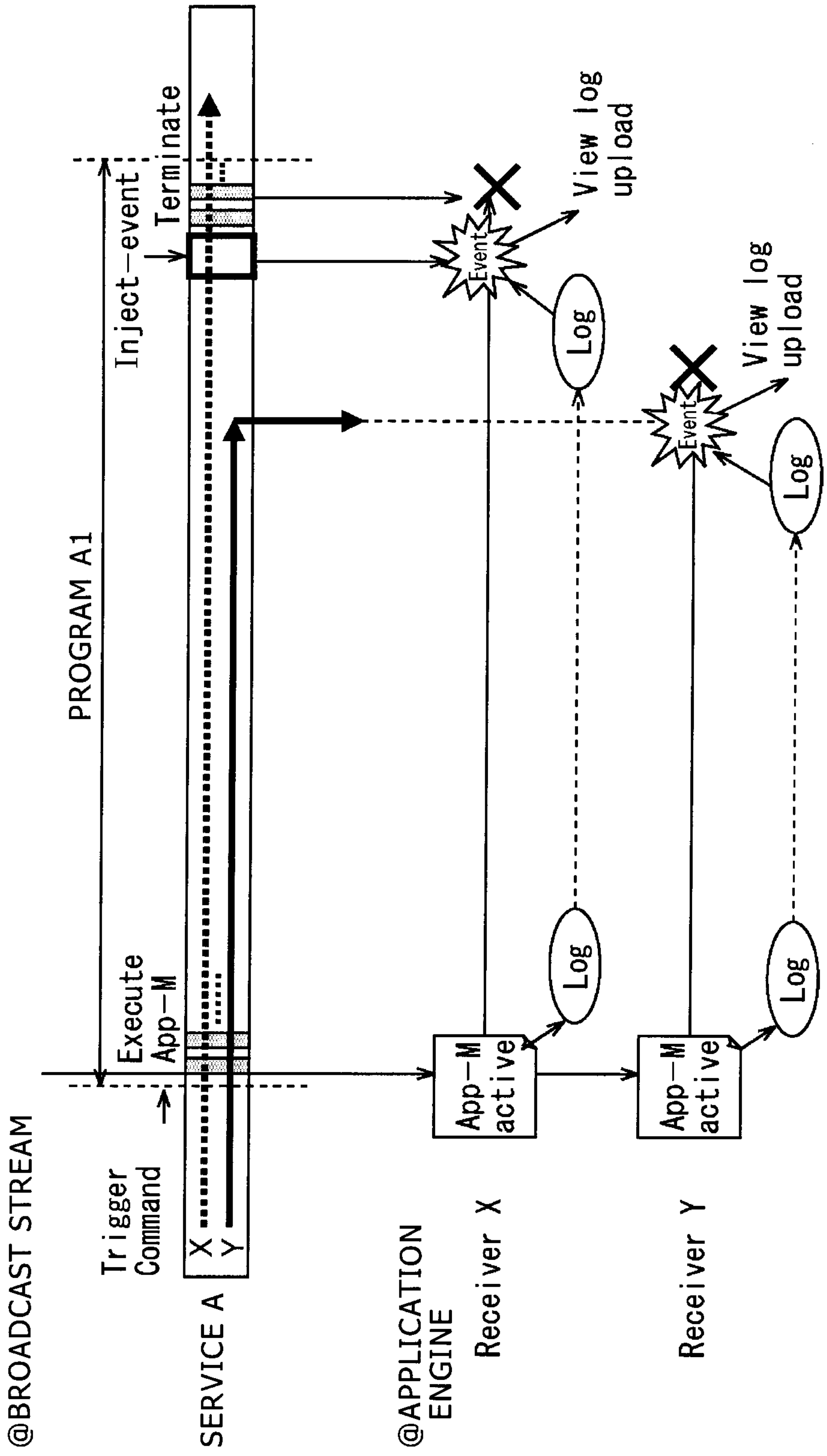
FIG. 19 is a second method of uploading viewing status information.

Referring to FIG. 19, there is shown a second method (a program-unit log upload scheme) of uploading view status information to the audience rating measuring server 43.

In the program-unit log upload scheme, information (or view log) including a view start time and view end time of a program concerned as view status information is transmitted to the audience rating measuring server 43 at the time of view end.

The audience rating measuring server 43 in the program-unit log upload scheme can be arranged on a program basis, on a service basis, or on a common to all services basis.

As shown in FIG. 18, if program A1 is broadcast in service (channel) A, the trigger information that is an execute command for starting up the audience rating measurement application App-M upon the start of program A1 is transmitted. Here, the audience rating measurement application App-M generates a view log including a view start time of program A concerned into the work memory 75A and additionally writes a view end time to the view log at the view end, uploading the view log to the audience rating measuring server 43.

Next, the trigger information that is an inject event command for firing the processing of additionally writing a view end time to the view log and uploading the view log to the audience rating measuring server 43 immediately before the end of program A1 broadcasting is transmitted K times. In addition, upon the end of program A1, the trigger information that is a terminate command for terminating the audience rating measurement application App-M is transmitted.

In the reception apparatus 60 (receiver X) having received program A1 from start to end thereof, the started audience rating measurement application App-M immediately regards the start time thereof as a view start time of program A1 by the user, thereby generating a view log including the view start time into the work memory 75A. Next, in response to the trigger information that is an inject event command transmitted immediately before the end of program A1, the audience rating measurement application App-M immediately regards this time as a view end time and additionally writes this view end time to the view log, uploading the view log to the audience rating measuring server 43. Subsequently, in response to the trigger information that is a terminate command, the audience rating measurement application App-M is terminated.

On the other hand, also in the reception apparatus 60 (receiver Y) that received program A1 from the start thereof but has not received program A1 up to the end thereof because of switching to another service (or channel) for example, the started audience rating measurement application App-M immediately regards the start time thereof as a view start time of program A1 by the user, thereby generating a view log including the view start time into the work memory 75A. Next, in response to the switching to another service for example, the audience rating measurement application App-M regards this time as a view end time and additionally writes the view end time to the view log, uploading the view log to the audience rating measuring server 43. Subsequently, the audience rating measurement application App-M is terminated.

Figure 20:
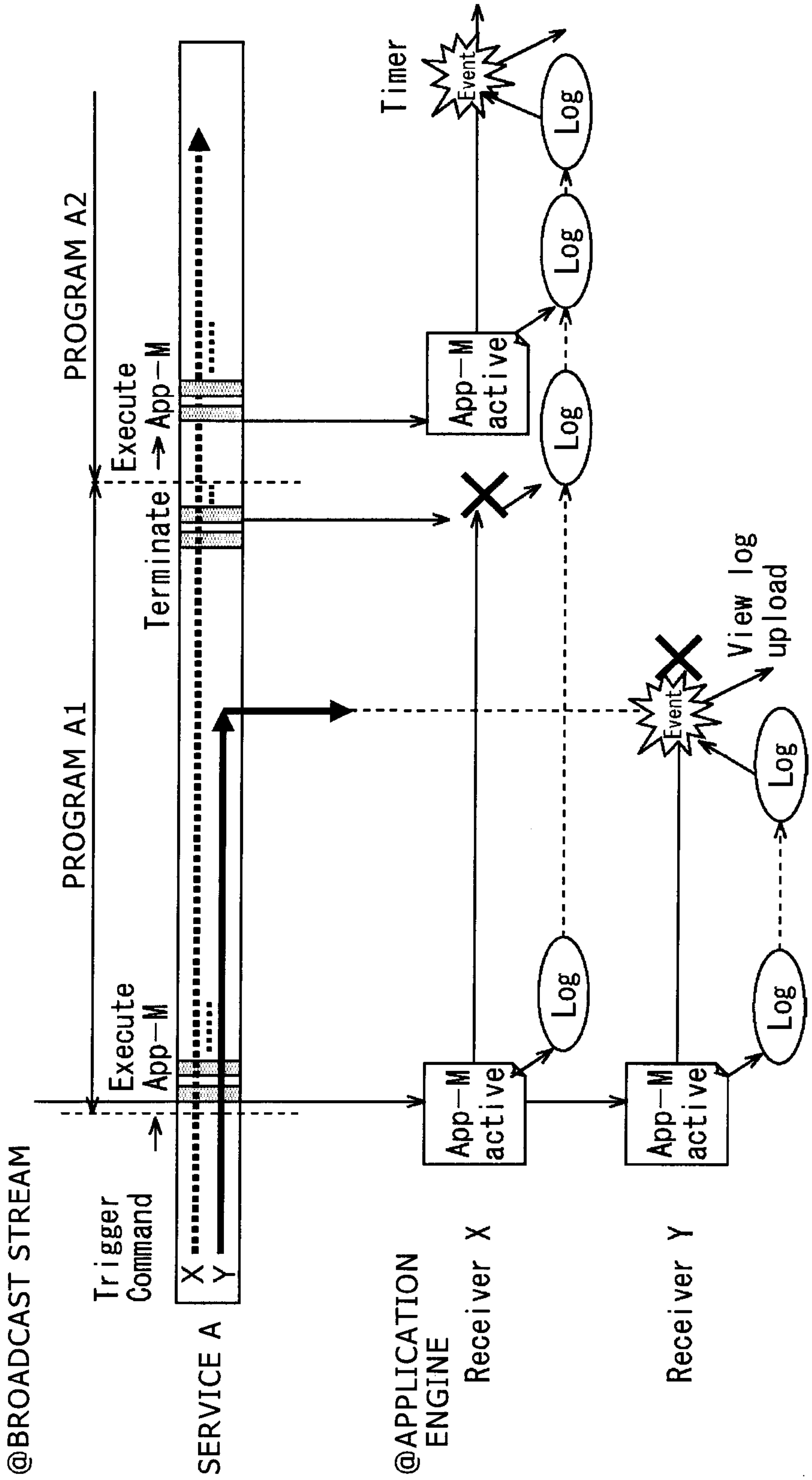
FIG. 20 is a third method of uploading viewing status information.

Referring to FIG. 20, there is shown a third method (a service-unit log upload scheme) of uploading view status information to the audience rating measuring server 43.

In the service-unit log upload scheme, a service, namely, a view log including a view start time and view end time for each channel, is periodically transmitted to the audience rating measuring server 43 as view status information.

The audience rating measuring server 43 in the service-unit log upload scheme can be arranged on a service basis or on a common to all services basis.

As shown in FIG. 20, if program A1 and program A2 are sequentially broadcast in service (channel) A, then trigger information that is an execute command for starting up the audience rating measurement application App-M upon starting of each program is transmitted. In addition, upon ending of each program, trigger information that is a terminate command for terminating the audience rating measurement application App-M is transmitted.

Here, the audience rating measurement application App-M generates a view log including a program view start time in the work memory 75A at the start of the audience rating measurement application App-M. It should be noted that if a view log exists in the work memory 75A, this view log is overwritten by a new view log. In addition, the audience rating measurement application App-M additionally writes a view end time to the view log at the own end time. Further, the audience rating measurement application App-M periodically uploads the generated view log to the audience rating measuring server 43 in accordance with a timer configured to operate independently of the audience rating measurement application App-M. This timer counts time every several periods (every three hours for example) with the startup of the audience rating measurement application App-M first in that day used as the origin. Setting this timer of each reception apparatus 60 allows the distribution of the accesses to the audience rating measuring server 43.

In the reception apparatus 60 (receiver X) that has received program A1 from start to end, the audience rating measurement application App-M started up at the start of program A1 immediately regards the own startup time as the view start time of program A1 and generates a view log including the view start time in the work memory 75A. Subsequently, in response to the trigger information that is a terminate command transmitted at the end of program A1, the audience rating measurement application App-M regards that time as a view end time, additionally writes the regarded time to the view log, and terminates the audience rating measurement application App-M.

Further, the audience rating measurement application App-M restarted at the start of program A2 immediately regards this restart time as a view start time of program A2 by the user and additionally writes the view start time to the view log in the work memory 75A. Subsequently, in accordance with the timing based on the timer, the audience rating measurement application App-M additional writes the current time to the view log and uploads the view log to the audience rating measuring server 43.

On the other hand, also in the reception apparatus 60 (receiver Y) that received program A1 from the beginning but has not received up to the end of program A1 because of switching to another service (or channel) halfway, the audience rating measurement application App-M started up at the start of program A1 immediately recognizes this startup time as a view start time of program A1 by the user and generates a view log including the view start time in the work memory 75A. Next, in response to the switching of service for example, the audience rating measurement application App-M regards the switching time as a view end time, additionally writes the view end time to the view log, and uploads the view log to the audience rating measuring server 43. Subsequently, the audience rating measurement application App-M is terminated.

Figure 21:
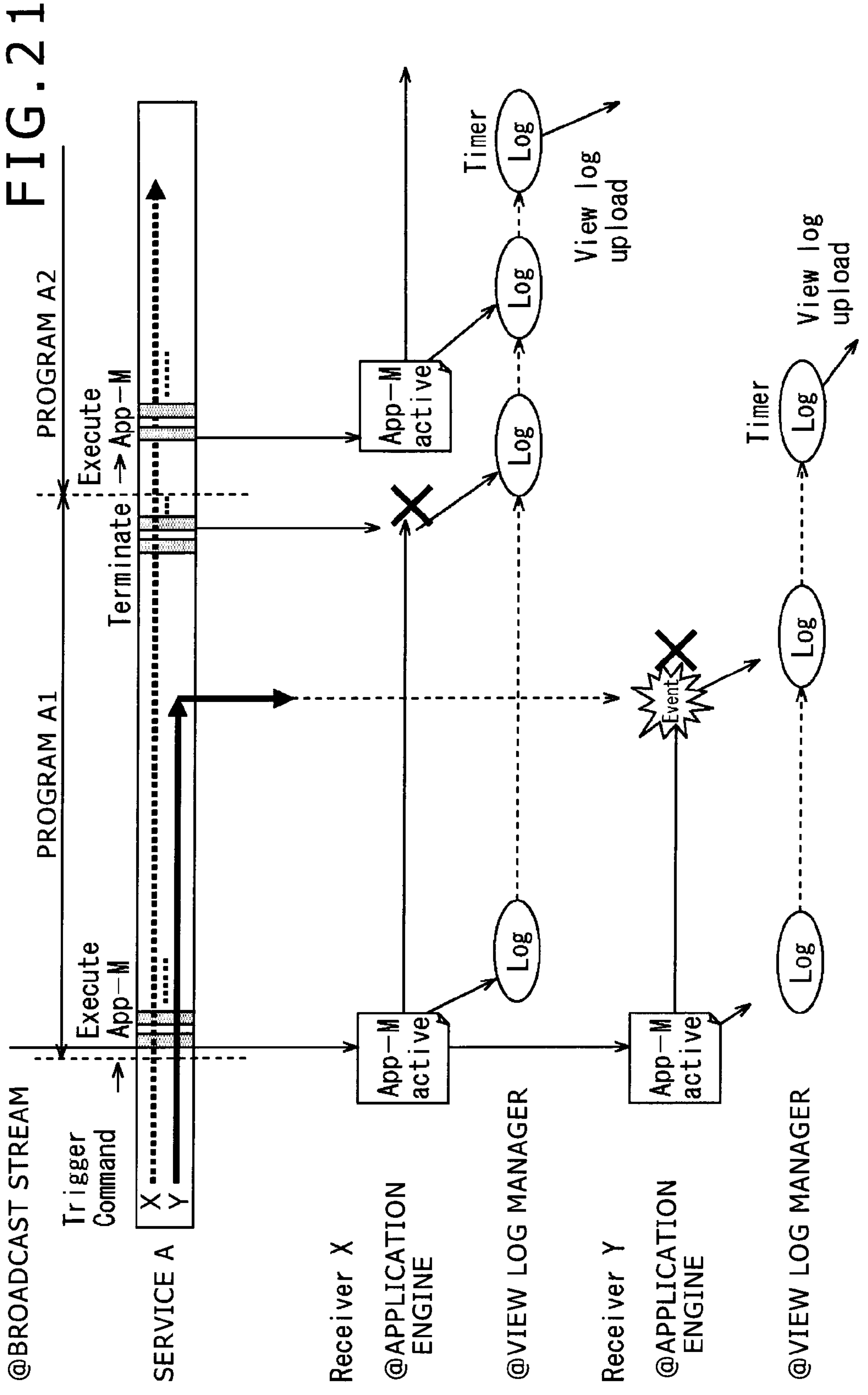
FIG. 21 is a fourth method of uploading viewing status information.

Referring to FIG. 21, there is shown a fourth method (or application resident hybrid scheme 1) of uploading view status information to the audience rating measuring server 43.

In the application resident hybrid scheme 1, the audience rating measurement application App-M records a view start time and a view end time to a view log for each service and a view log manager independent of the audience rating measurement application App-M periodically uploads the view log to the audience rating measuring server 43 in accordance with the timer.

The audience rating measuring server 43 in the application resident hybrid scheme 1 can be arranged on a service basis or on a common to all services basis.

It should be noted that the view log manager is realized by the startup of a program previously held by the control block 68 or the application engine 74. The view log manager may be started up when the main power to the reception apparatus 60 is turned on or periodically started up according to the timer only when a view log is uploaded.

As shown in FIG. 21, if program A1 and program A2 are sequentially broadcast in service (channel) A, trigger information that is an execute command for starting up the audience rating measurement application App-M is transmitted upon starting of each program. Also, trigger information that is a terminate command for terminating the audience rating measurement application App-M is transmitted upon ending of each program.

Here, the audience rating measurement application App-M additionally writes view information including a view start time to a view log managed by the view log manager at starting of the audience rating measurement application App-M. It should be noted that, if a view log already exists in the work memory 75A, the view information is written to this view log. In addition, the audience rating measurement application App-M additionally writes a view end time to the view log at the own end time. On the other hand, the view log manager periodically uploads the view log to the audience rating measuring server 43 in accordance with the time configured to operate independently of the audience rating measurement application App-M. This timer counts time every several periods (every three hours for example) with the power-on of the reception apparatus 60 first in that day used as the origin. If the power is off, the view log manager may be automatically started up to upload the view log at the time the view log should be uploaded. Setting the timer of each reception apparatus 60 allows the distribution of the accesses to the audience rating measuring server 43. Alternatively, an upload time may be stored for each reception apparatus 60 specified at the time of communication with the audience rating measuring server 43, thereby uploading each view log.

In the reception apparatus 60 (receiver X) that has received program A1 from start to end in service A, the audience rating measurement application App-M started up at the start of program A1 immediately regards the startup time as a view start time of program A1 by the user and additionally writes view information including the view start time to a view log. Subsequently, in response to trigger information that is a terminate command transmitted at the end of program A1, the audience rating measurement application App-M regards that time as a view end time, additionally writes this view end time to the view log, and terminates the audience rating measurement application App-M. It should be noted that if the view log manager operates under the control of the control block 68, then the audience rating measurement application App-M additionally writes the view log to the memory 69 attached to the control block.

Further, the audience rating measurement application App-M restarted at the starting of program A2 immediately regards this startup time as a view start time of program A2 and additionally writes this view start time to the view log in the work memory 75A. Subsequently, in accordance with a timing based on the timer, the view log manager uploads the view log to the audience rating measuring server 43.

On the other hand, also in the reception apparatus 60 (receiver Y) that receives program A1 from the beginning thereof but has not received program A1 up to the end thereof because of switching to another service (channel) for example, the audience rating measurement application App-M started up at the starting of program A1 immediately regards this startup time as a view start time of program A1 by the user and additionally writes view information including this view start time to the view log. Next, in response to the switching of services for example, the audience rating measurement application App-M regards the switching time as a view end time of the program and additionally writes the view end time to view log. Subsequently, in accordance with a timing based on the timer, the view log manager uploads the view log to the audience rating measuring server 43.

It should be noted that if the view log manager operates in the application engine as a data broadcast application, the timing of uploading the view log to the audience rating measuring server 43 may be indicated not by use of the timer but by use of trigger information that is an inject event command.

Figure 22:
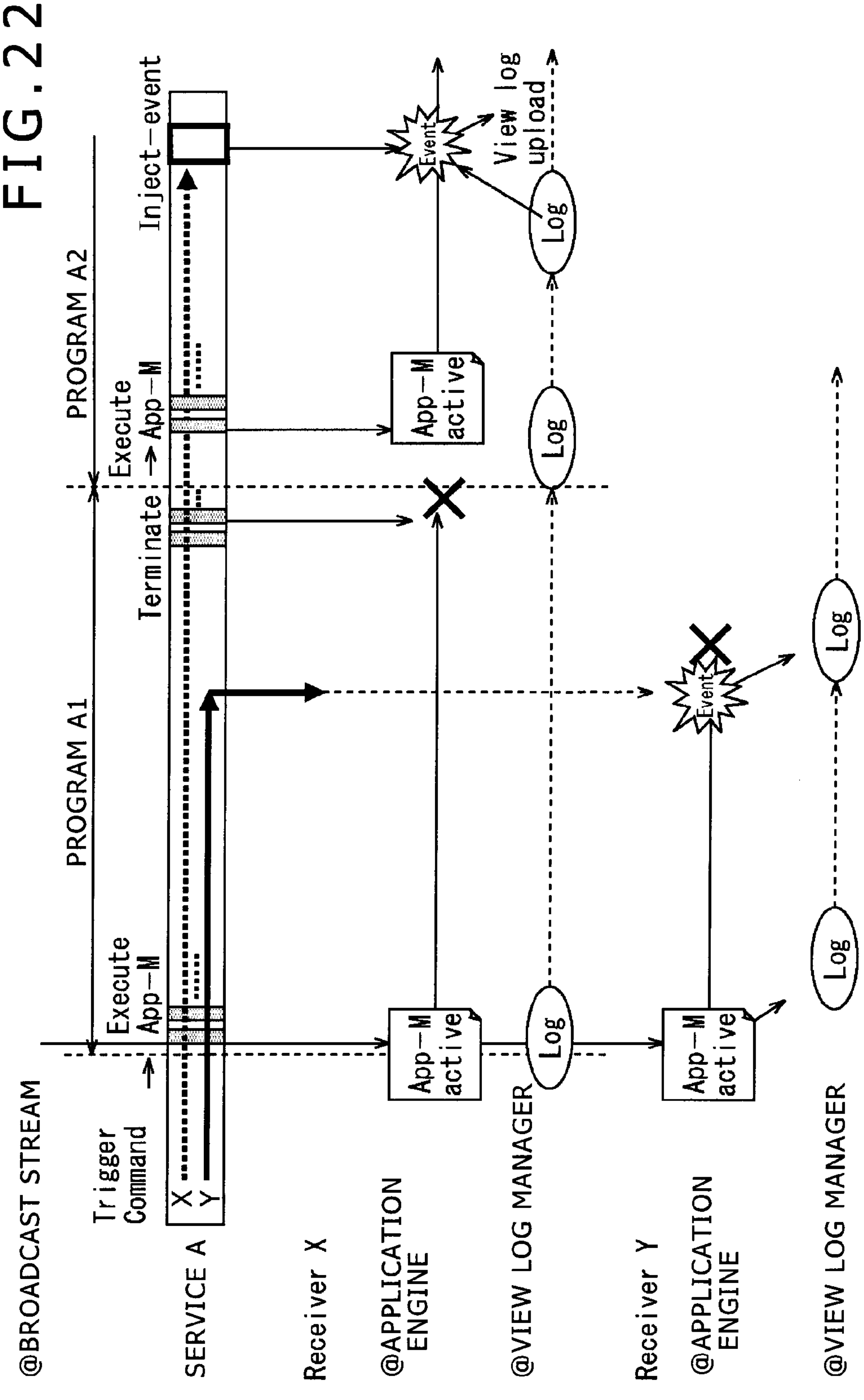
FIG. 22 is a fifth method of uploading viewing status information.

Referring to FIG. 22, there is shown a fifth method (application resident hybrid scheme 2) of uploading view status information to the audience rating measuring server 43.

In application resident hybrid scheme 2, the view log manager normally in a startup status generates and updates a view log on service basis or on a common to all services basis and the audience rating measurement application App-M that is a data broadcast application uploads the view log to the audience rating measuring server 43 as the view status information in accordance with trigger information that is an inject event command.

The audience rating measuring server 43 in application resident hybrid scheme 2 can be arranged on a service basis or on a common to all services basis.

It should be noted that the view log manager is realized by the starting up of the program previously held in the control block 68 or the application engine 74. The view log manager is started up when the main power to the reception apparatus 60 is turned on. The view log manager generates a view log including a view start time of each program regardless of the data broadcast application. It should be noted that, if a view log already exists, the generated view log is additionally written to the existing view log. In addition, the view log manager additionally writes a program end time, a channel switched time, or a power-off time to the view log as a program end time. This view log is uploaded to the audience rating measuring server 43 by the audience rating measurement application App-M for view information uploading in accordance with trigger information that is an inject event command.

As shown in FIG. 22, if program A1 and program A2 are sequentially broadcast in service (channel) A, trigger information that is an execute command for starting up the audience rating measurement application App-M for view information uploading is transmitted upon starting of each program. In addition, upon ending of each program, trigger information that is a terminate command for terminating the audience rating measurement application App-M is transmitted. In response to these trigger information, the audience rating measurement application App-M is started up and terminated; however, the view information uploading application is an application that basically uploads the view log to the audience rating measuring server 43 at the time uploading is specified by the inject event command. On the other hand, the view log manager updates the view log at a program start time, a program end time, a channel switched time, or power-on/off time regardless of the view information uploading application and additionally writes a list of channel numbers subject to viewing, view start times, and view end times to the view log. It should be noted that, if the view log manager operates under the control of the control block 68, the view log is recorded to the memory 69.

In the reception apparatus 60 (receiver X) that has received program A1 from start to end in service A with the view log manager started up and a view log generated, the view log manager additionally writes view information including a channel number and a program start time to the view log at the starting of program A1. Subsequently, the view log manager additionally writes the end time of program A1 to the view log at the end of program A1.

Further, at the starting of program A2, the view log manager additionally writes a channel number and a program start time to the view log. Subsequently, when trigger information that is an inject event command is received, the audience rating measurement application App-M uploads the view log at that moment to the audience rating measuring server 43 in response to the received trigger information that is an inject event command.

On the other hand, also in the reception apparatus 60 (receiver Y) that received program A1 from the beginning but has not received program A1 up to the end thereof because of a service (channel) change halfway with the view log manager started up and a view log generated, view information including a channel number and a program start time is additionally written to the view log at the starting of program A1. Next, in response to the service change for example, the view log manager regards the service change time as a view end time and additionally writes the view end time to the view log. Then, after the starting up of the audience rating measurement application App-M upon the starting of a new program, the view log is uploaded to the audience rating measuring server 43 by the audience rating measurement application App-M in response to the reception of trigger information that is an inject event command.

It should be noted that, in uploading the view log in accordance with the trigger information that is an inject event command, only a view log corresponding to a service being received is uploaded to the audience rating measuring server 43 or view logs corresponding to all services are uploaded to the audience rating measuring server 43.

Figure 23:
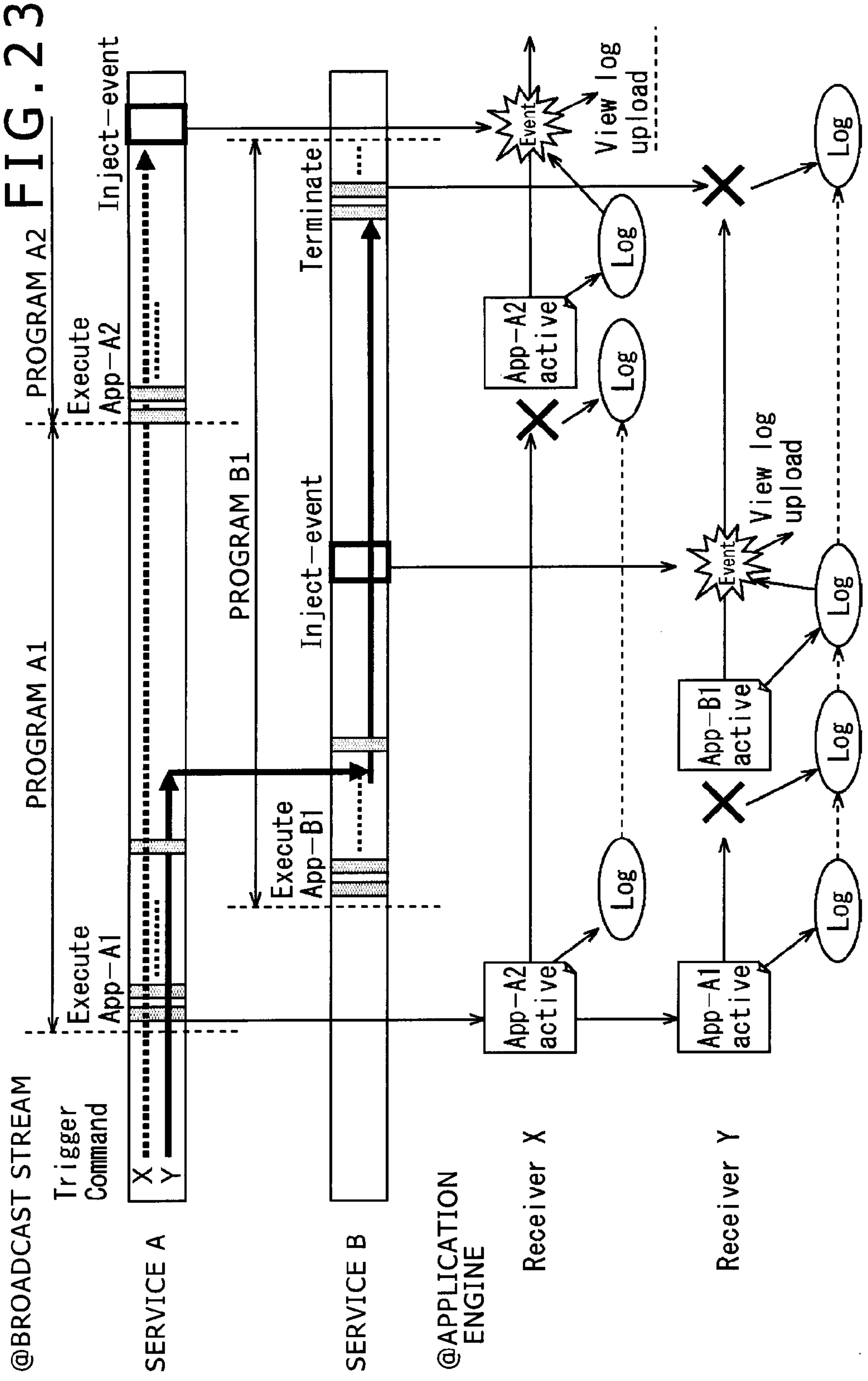
FIG. 23 is a sixth method of uploading viewing status information.

Referring to FIG. 23, there is shown a sixth method (a third-parties-common log operation scheme) of uploading view status information to the audience rating measuring server 43.

In the third-parties-common log operation scheme, information (a view log) including a view start time and a view end time of a program is generated extending over services, or so-called channels. The generated view log is transmitted to the audience rating measuring server 43 common to the all channels as view status information.

As shown in FIG. 23, if program A1 and program A2 are sequentially broadcast in service (channel) A, trigger information that is an execute command for starting up data broadcast applications App-A1 and App-A2 is transmitted upon the starting of each program. In addition, trigger information that is an inject event command for uploading a view log to data broadcast applications App-A1 and App-A2 is transmitted with a predetermined timing. This holds true with service B.

It should be noted that the data broadcast application App-A1 and so on also have a function of a data broadcast application for presenting predetermined information about the user in addition to the functions of recording and uploading view logs.

In the reception apparatus 60 (receiver X) that has received program A1 from start to end in service A, the data broadcast application App-A1 started up at the starting of program A1 immediately regards this startup time as a view start time of program A1 by the user and generates a view log including the view start time into the work memory 75A. Next, when trigger information that is an execute command for starting up the data broadcast application App-A2 corresponding to program A2 is received, the active data broadcast application App-A1 regards that time as a view end time and additionally writes the view end time to the view log, thereby terminating the data broadcast application App-A1.

Further, when the data broadcast application App-A2 is started up on the starting of program A2, the data broadcast application App-A2 immediately regards this startup time as a view start time of program A2 by the user and additionally writes this view start time to the view log in the work memory 75A. Next, when trigger information that is an inject event command is received, the data broadcast application App-A2 additionally writes the current time to the view log and uploads the view log to the audience rating measuring server 43.

On the other hand, in the reception apparatus 60 (receiver Y) that received program A1 from the beginning and has switched to program B1 of service B halfway, the data broadcast application App-A1 started up at the starting of program A1 immediately regards this startup time as a view start time of program A1 by the user and generates a view log including the view start time into the work memory 75A. Next, in response to the service switching, the data broadcast application App-A1 regards the switching time as a view end time and additionally writes the view end time to the view log. Subsequently, a data broadcast application App-B1 is started up in response to switched program B1 to immediately regard this startup time as a view start time of program B1, additionally writing the view start time to the view log. Next, when trigger information that is an inject event command is received, the data broadcast application App-B1 additionally writes the current time to the view log and uploads the view log to the audience rating measuring server 43. Subsequently, in response to trigger information that is a terminate command transmitted at the end of program B1, the data broadcast application App-B1 regards the time of the transmission as a view end time and additionally writes the view end time to the view log, thereby terminating the data broadcast application App-B1.

Figure 24:
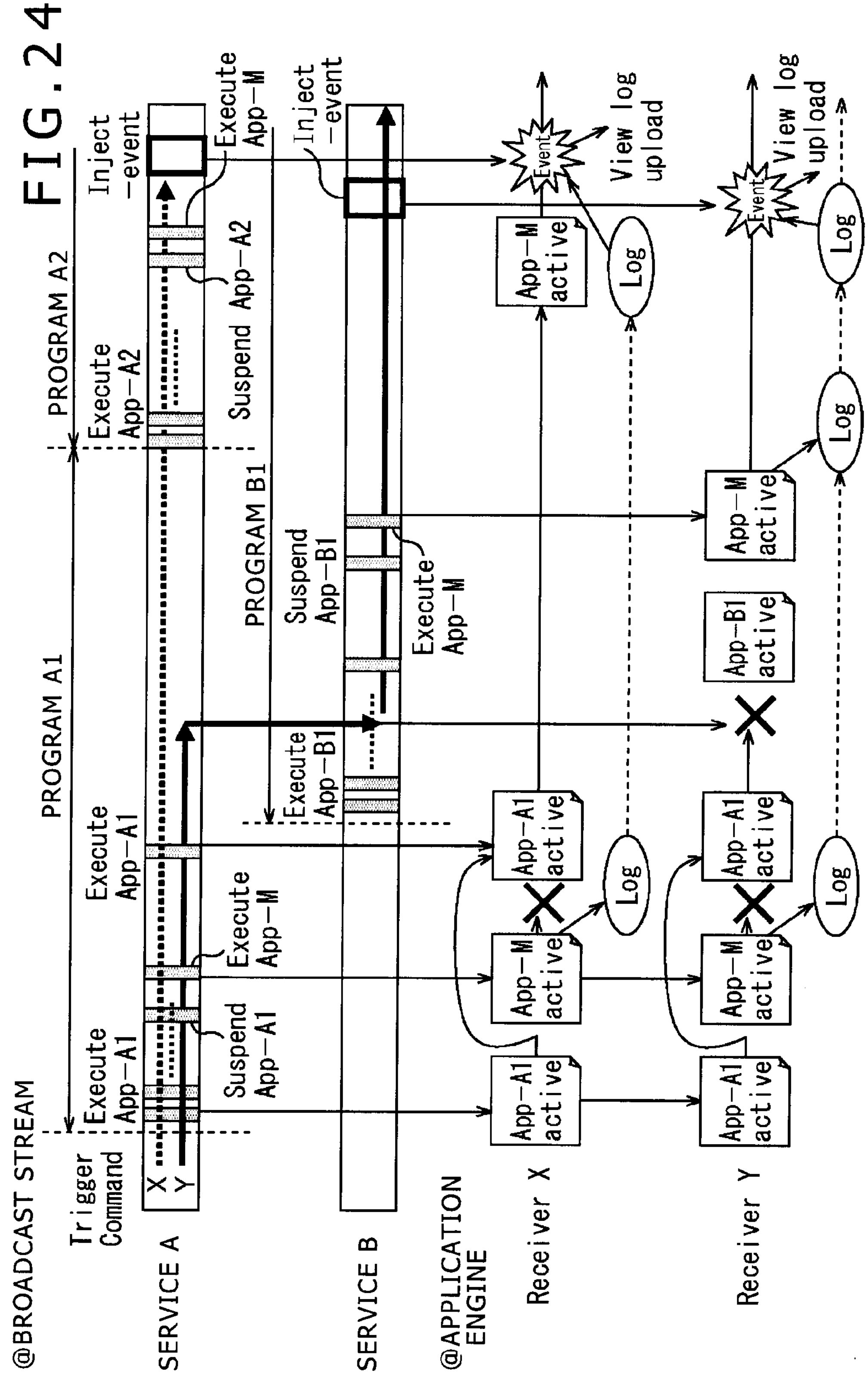
FIG. 24 is a seventh method of uploading viewing status information.

Referring to FIG. 24, there is shown a seventh method (a third parity measurement application insertion scheme) of uploading view status information to the audience rating measuring server 43.

In the third party measurement application insertion scheme, the data broadcast application App-A1 and so on to be executed along the progression of a program are transitioned to a suspended status, during which the audience rating measurement application App-M for recording and uploading a view log is executed. Consequently, information (a view log) including a view start time and view end time of a program is generated extending over a service, or a so-called channel, the generated view log is transmitted to the audience rating measuring server 43 common to all channels as view status information.

As shown in FIG. 24, if program A1 is broadcast in service A (channel), trigger information that is an execute command for starting up the data broadcast application App-A1 is transmitted upon the starting of program A1. Subsequently, trigger information that is a suspend command for suspending the data broadcast application App-A1 in an active status is transmitted. Subsequently, trigger information that is an execute command for starting up the audience rating measurement application App-M is transmitted. Then, when a time comes to terminate the audience rating measurement application App-M, trigger information that is an execute command for returning the data broadcast application App-A1 from the suspended status to an active status is transmitted.

If program A2 is broadcast after program A1 and if program B1 is broadcast in service B, substantially the same processing as with program A1 takes place.

In the reception apparatus 60 (receiver X) that has received program A1 from start to end in service A, the data broadcast application App-A1 is started up at the starting of program A1. Subsequently, the data broadcast application App-A1 is transitioned to a suspended status, upon which the audience rating measurement application App-M is started up. The started up audience rating measurement application App-M immediately regards this startup time as a view time by the user and generates a view log including service A being viewed and the view time into the work memory 75A. Next, when trigger information that is an execute command for the data broadcast application App-A1 is received, the audience rating measurement application App-M is terminated, upon which the data broadcast application App-A1 is transitioned to an active status again.

Subsequently, when program A1 ends and program A2 starts, the data broadcast application App-A2 is started up (now shown). Subsequently, the data broadcast application App-A2 is transitioned to a suspended state (not shown), upon which the audience rating measurement application App-M is started up. The started up audience rating measurement application App-M immediately regards this startup time as a view time by the user and additionally writes service A being viewed and the view time to the view log in the work memory 75A. Next, when trigger information that is an inject event command for the audience rating measurement application App-M is received, the audience rating measurement application App-M uploads the view log to the audience rating measuring server 43.

On the other hand, in the reception apparatus 60 (receiver Y) that received program A1 from the beginning but has switched to program B1 of service B halfway, the data broadcast application App-A1 is started up at the starting of program A1. Subsequently, the data broadcast application App-A1 is transitioned to a suspended state, upon which the audience rating measurement application App-M is started up. The started up audience rating measurement application App-M immediately regards this startup time as a view time by the user and generates a view log including service A being viewed and the view time into the work memory 75A. Next, when trigger information that is an execute command for the data broadcast application App-A1 is received, the audience rating measurement application App-M is terminated and the data broadcast application App-A1 is transitioned to an active status again. Subsequently, when switching is made from service A to service B, the data broadcast application App-A1 is terminated.

After switching to program B1 of service B, the data broadcast application App-B1 is started up. Subsequently, the started up data broadcast application App-B1 is transitioned to a suspended status, upon which the audience rating measurement application App-M is started up. The started up audience rating measurement application App-M immediately regards this startup time as a view time by the user and additionally writes service B being viewed and the view time to the view log in work memory 75A. Subsequently, when trigger information that is an inject event command for the audience rating measurement application App-M is received, the audience rating measurement application App-M uploads the view log to the audience rating measuring server 43.

Employing any one of the first through seventh methods of uploading view status information to the audience rating measuring server 43 allows the uploading of view status information from all active reception apparatuses 60 to the audience rating measuring server 43 by use of the audience rating measurement application App-M that is controllable like data broadcast applications. Consequently, this novel configuration allows the accurate measurement of television program audience ratings.

The view status information upload timings can be temporally distributed to prevent the concentration of accesses to the audience rating measuring server 43.

It should be noted that, in addition to view status information, profile information of the user of each reception apparatus 60 may be uploaded to the audience rating measuring server 43.

It is also practicable to specify the profile information of the user of each reception apparatus 60 to be sampled on the broadcasting station side, thereby starting up the audience rating measurement application App-M only when the profile information of the user satisfies the specified conditions.

In any of the first through sevenths methods described above, it is also practicable for the audience rating measurement application App-M or the view information upload application to include information display that is cooperatively connected to programs for example.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 25:
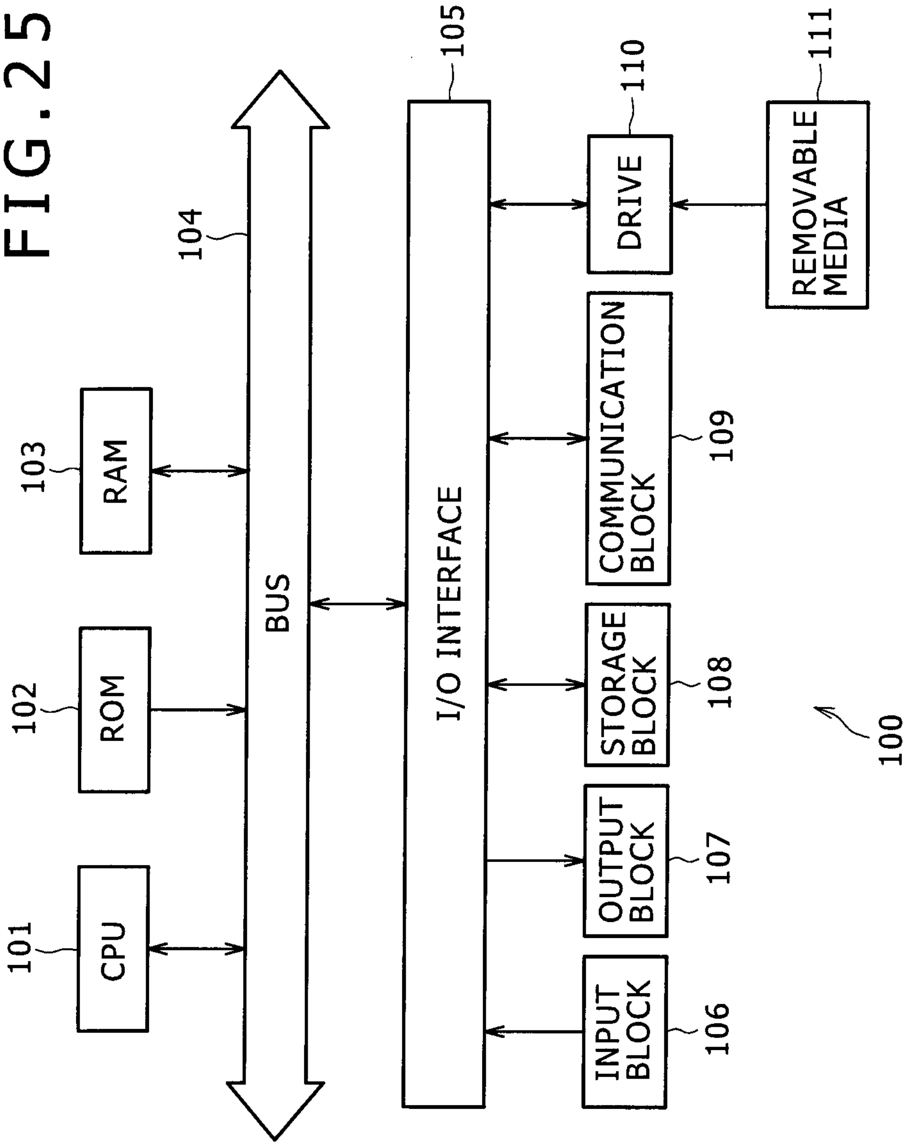
FIG. 25 is a block diagram illustrating an exemplary configuration of a computer.

Referring to FIG. 25, there is shown a block diagram illustrating an exemplary hardware configuration of a computer that executes the above-mentioned sequence of processing by software programs.

In this computer 100, a CPU (Central Processing Unit) 101, a ROM (Read Only Memory) 102, and a RAM (Random Access Memory) 103 are interconnected by a bus 104.

The bus 104 is connected to an input/output interface 105. The input/output interface 105 is connected to an input block 106 made up of a keyboard, a mouse, and a microphone, for example, an output block 107 made up of a monitor display and a loudspeaker, for example, a storage block 108 made up of a hard disk drive or a nonvolatile memory, for example, a communication block made up of a network interface for example, and a drive 110 for driving a removable media 111, such as a magnetic disk, an optical disk, a magneto-optical disk, or a semiconductor memory.

In the computer configured as described above, the CPU 101 loads programs from the storage block 108 into the RAM 103 via the input/output interface 105 and the bus 104 and executes loaded programs, thereby executing the above-mentioned sequence of processing.

It should be noted that the programs to be executed by the computer may be executed in a time-dependent manner in the sequences described herein or in parallel or on an on-demand basis.

It should also be noted that programs may be processed by one unit of computer or by two or more units of computers in a distributed manner. Further, programs may be transmitted to a remote computer to be executed.

It should also be noted that term "system" as used herein denotes an entire apparatus configured by a plurality of component units.

While preferred embodiments of the present disclosure have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-222299 filed in the Japan Patent Office on Sep. 30, 2010, the entire content of which is hereby incorporated by reference.

What is claimed is:

1. A reception apparatus for receiving transmitted AV (Audio/Video) content and an audience rating measurement application program associated with the AV content, comprising:

an extraction section configured to extract audience rating measurement trigger information associated with control of the audience rating measurement application program using at least one processor, wherein the audience rating measurement application program is transmitted with said AV content and the audience rating measurement application program is executed in cooperation with playback of the AV content, and further wherein said audience rating measurement trigger information includes a plurality of triggers, each one of the plurality of triggers having a parameter indicative of a determination probability corresponding to a trigger validity; and a control section configured to control said audience rating measurement application program using the at least one processor based upon a command comprised in said extracted audience rating measurement trigger information, wherein said audience rating measurement application program in an active status is executed based upon said command to:

generate view status information indicative of viewing habits of said AV content associated with the audience rating measurement application program of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

2. The reception apparatus according to claim 1, wherein said control section controls at least one of acquisition of said audience rating measurement application program, the execution of said audience rating measurement application program, an event firing in said audience rating measurement application program in the active status, suspension of said audience rating measurement application program in the active status, and termination of said audience rating measurement application program in the active status in accordance with the command comprised in said extracted audience rating measurement trigger information.

3. The reception apparatus according to claim 2, wherein said audience rating measurement application program in the active status fires the event in accordance with the command comprised in said extracted audience rating measurement trigger information and uploads said view status information to the predetermined audience rating measurement server as said event.

4. The reception apparatus according to claim 1, further comprising:

a holding section configured to hold profile information of a user using the at least one processor.

5. The reception apparatus according to claim 4, wherein said audience rating measurement application program in the active status uploads said profile information held in said holding section to a predetermined audience rating measurement server along with said view status information.

6. The reception apparatus according to claim 4, wherein said control section starts up said audience rating measurement application program only when said profile information held in said holding section satisfies a specified condition.

7. A reception method for a reception apparatus for receiving transmitted AV (Audio/Video) content, comprising:

extracting audience rating measurement trigger information associated with control of an audience rating measurement application program using at least one processor, wherein the audience rating measurement application program is transmitted with said AV content and the audience rating measurement application program is executed in cooperation with playback of the AV content, and further wherein said audience rating measurement trigger information includes a plurality of triggers, each one of the plurality of triggers having a parameter indicative of a determination probability corresponding to a trigger validity; and control said audience rating measurement application program using the at least one processor based upon a command comprised in said extracted audience rating measurement trigger information, wherein said audience rating measurement application program in an active status is executed based upon said command to:

generate view status information indicative of viewing habits of said AV content associated with the audience rating measurement application program of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

8. A non-transitory computer-readable medium having embodied thereon a computer program for controlling a reception apparatus for receiving transmitted AV (Audio/Video) content, which when executed by a processor of a computer causes the processor to perform a method, the method comprising:

extracting audience rating measurement trigger information associated with control of an audience rating measurement application program using at least one processor, wherein the audience rating measurement application program is transmitted with said AV content and the audience rating measurement application program is executed in cooperation with playback of the AV content, and further wherein said audience rating measurement trigger information includes a plurality of triggers, each one of the plurality of triggers having a parameter indicative of a determination probability corresponding to a trigger validity; and control said audience rating measurement application program using the at least one processor based upon a command comprised in said extracted audience rating measurement trigger information, wherein said audience rating measurement application program in an active status is executed based upon said command to:

generate view status information indicative of viewing habits of said AV content associated with the audience rating measurement application program of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

9. A transmission apparatus for transmitting AV (Audio/Video) content and an audience rating measurement application program associated with the AV content, comprising:

a transmission section configured to transmit using at least one processor audience rating measurement trigger information associated with control of the audience rating measurement application program to be executed on a reception apparatus along with said AV content in cooperation therewith, wherein said audience rating measurement trigger information includes a plurality of triggers, each one of the plurality of triggers having a parameter indicative of a determination probability corresponding to a trigger validity, wherein the audience rating measurement application program is transmitted with said AV content and the audience rating measurement application program is executed in cooperation with playback of the AV content on the reception apparatus, and wherein said audience rating measurement application program in an active status is executed based upon a command to:

generate view status information indicative of a content viewing habits of said AV content of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

10. The transmission apparatus according to claim 9, further comprising:

a measurement section configured to measure using the at least one processor an audience rating of said AV content on the basis of said view status information uploaded by said reception apparatus.

11. A transmission method for a transmission apparatus for transmitting AV (Audio/Video) content and an audience rating measurement application program associated with the AV content, comprising:

transmitting audience rating measurement trigger information associated with control of the audience rating measurement application program to be executed on a reception apparatus along with said AV content in cooperation therewith, wherein said audience rating measurement trigger information includes a plurality of triggers, each one of the plurality of triggers having a parameter indicative of a determination probability corresponding to a trigger validity, wherein the audience rating measurement application program is transmitted with said AV content and the audience rating measurement application program is executed in cooperation with playback of the AV content on the reception apparatus, and wherein said audience rating measurement application program in an active status is executed based upon a command to:

generate view status information indicative of a content viewing habits of said AV content of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

12. A non-transitory computer-readable medium having embodied thereon a computer program for controlling a transmission apparatus for transmitting AV (Audio/Video) content, which when executed by a processor of a computer causes the processor to perform a method, the method comprising:

transmitting audience rating measurement trigger information associated with control of an audience rating measurement application program, wherein said audience rating measurement trigger information includes a plurality of triggers, each one of the plurality of triggers having a parameter indicative of a determination probability corresponding to a trigger validity, wherein the audience rating measurement application program is transmitted with said AV content and the audience rating measurement application program is executed in cooperation with playback of the AV content on the reception apparatus, and wherein said audience rating measurement application program in an active status is executed based upon a command to:

generate view status information indicative of a content viewing habits of said AV content of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

13. A broadcasting system comprising:

a transmission apparatus for transmitting AV (Audio/Video) content and an audience rating measurement application program associated with the AV content using at least one processor; and a reception apparatus for receiving said transmitted AV content using the at least one processor, wherein said transmission apparatus has a transmission section configured to transmit using the at least one processor audience rating measurement trigger information associated with control of the audience rating measurement application program to be executed on a reception apparatus, wherein said audience rating measurement trigger information includes a plurality of triggers, each one of the plurality of triggers having a parameter indicative of a determination probability corresponding to a trigger validity, wherein said reception apparatus has an extraction section configured to extract audience rating measurement trigger information associated with control of the audience rating measurement application program using at least one processor, wherein the audience rating measurement application program is transmitted with said AV content and a control section configured to control said audience rating measurement application program using the at least one processor based upon a command comprised in said extracted audience rating measurement trigger information, wherein the audience rating measurement application program is executed in cooperation with playback of the AV content, and wherein said audience rating measurement application program in an active status is executed based upon said command to:

generate view status information indicative of viewing habits of said AV content associated with the application program of at least one user of said reception apparatus, and upload said view status information to a predetermined audience rating measurement server based on the determination probability of each one of the plurality of triggers, such that said view status information is uploaded in response to only one of the plurality of triggers when said one of the plurality of triggers is determined to be valid.

14. The reception apparatus according to claim 1, wherein said audience rating measurement application program is transparent to the at least one user of said reception apparatus.

15. The reception apparatus according to claim 14, wherein said audience rating measurement application program is independent of a graphical user interface of said reception apparatus.

16. The reception apparatus according to claim 1, wherein the audience rating measurement trigger information is transparent to the at least one user of said reception apparatus.

17. The reception apparatus according to claim 16, wherein the audience rating measurement trigger information is independent of a graphical user interface of said reception apparatus.

18. The reception apparatus according to claim 1, wherein the command comprised in said extracted audience rating measurement trigger information is the same in each one of the plurality of triggers, while the determination probability increases for successive ones of the plurality of triggers.

19. The reception apparatus according to claim 18, wherein the determination probability is related to an amount of the plurality of triggers.

20. The reception apparatus according to claim 19, wherein the determination probability is a reciprocal of the amount of triggers remaining from among the plurality of triggers.

* * * * *